US010496717B2

United States Patent
Glover et al.

(10) Patent No.: US 10,496,717 B2
(45) Date of Patent: Dec. 3, 2019

(54) STORING PREDICTED SEARCH RESULTS ON A USER DEVICE BASED ON SOFTWARE APPLICATION USE

(71) Applicant: Samsung Electronics Co., Ltd., Suwon-si, Gyeonggi-do (KR)

(72) Inventors: Eric J. Glover, Palo Alto, CA (US); Marshall James Quander, Mountain View, CA (US); Leigh Klotz, Jr., Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 739 days.

(21) Appl. No.: 14/861,013

(22) Filed: Sep. 22, 2015

(65) Prior Publication Data

US 2016/0188708 A1 Jun. 30, 2016

Related U.S. Application Data

(60) Provisional application No. 62/098,899, filed on Dec. 31, 2014.

(51) Int. Cl.
*G06F 16/9535* (2019.01)
*G06F 16/957* (2019.01)

(52) U.S. Cl.
CPC ...... *G06F 16/9535* (2019.01); *G06F 16/9574* (2019.01)

(58) Field of Classification Search
CPC .......... G06F 17/30554; G06F 16/9535; G06F 16/9574
See application file for complete search history.

(56) References Cited

U.S. PATENT DOCUMENTS

| 8,527,489 B1* | 9/2013 | Li | G06F 16/9535 707/706 |
|---|---|---|---|
| 9,384,266 B1* | 7/2016 | Leicht | G06F 17/3064 |
| 2007/0067272 A1* | 3/2007 | Flynt | G06F 3/0482 |
| 2008/0154612 A1* | 6/2008 | Evermann | H04M 1/72522 704/275 |
| 2013/0325343 A1* | 12/2013 | Blumenberg | G01C 21/00 701/533 |
| 2014/0052683 A1* | 2/2014 | Kirkham | G06Q 30/0631 706/46 |
| 2015/0066886 A1* | 3/2015 | Wu | G06F 17/30864 707/706 |

(Continued)

*Primary Examiner* — Albert M Phillips, III
(74) *Attorney, Agent, or Firm* — Jefferson IP Law, LLP

(57) ABSTRACT

Techniques include transmitting a request that indicates one or more native applications that are installed on a user device to a search system. The techniques further include receiving a first set of (e.g., predicted) search results from the search system in response to transmitting the request. Each search result includes an application access mechanism that references one of the native applications and indicates operations for the application to perform (e.g., specifies an application state of the application). The techniques also include receiving a search query from a user, identifying one or more search results of the first set using the query, transmitting the query to the search system, receiving a second set of (e.g., supplemental) search results from the search system in response to transmitting the query, and displaying the identified search results of the first set and the search results of the second set to the user.

28 Claims, 11 Drawing Sheets

(56) References Cited

U.S. PATENT DOCUMENTS

2015/0142560 A1\* 5/2015 Singh ................ G06Q 30/0267
　　　　　　　　　　　　　　　　　　　　705/14.53
2015/0278358 A1\* 10/2015 Abib .................... G06F 16/951
　　　　　　　　　　　　　　　　　　　　707/706

\* cited by examiner

User selects link 236-2 for "Denny's"

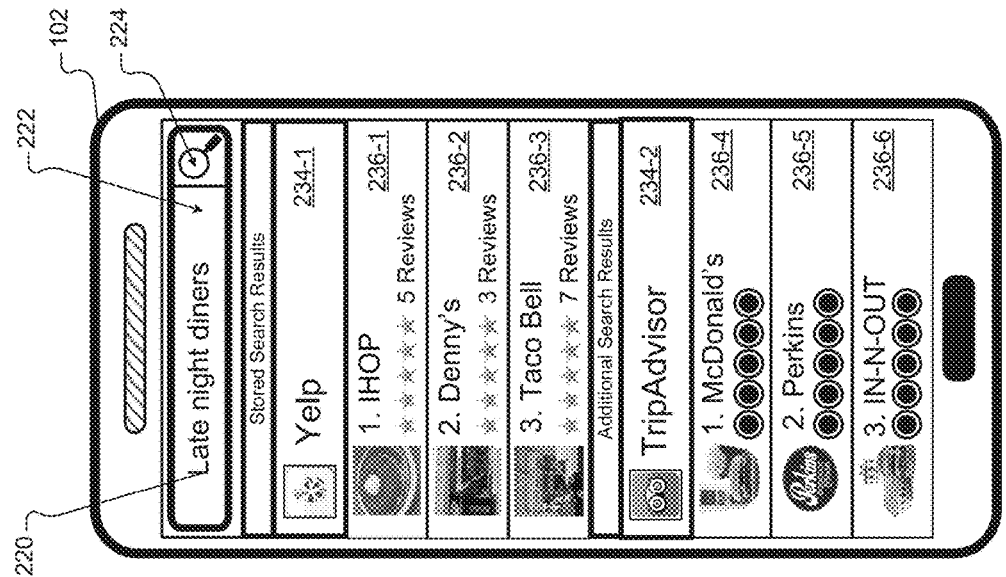
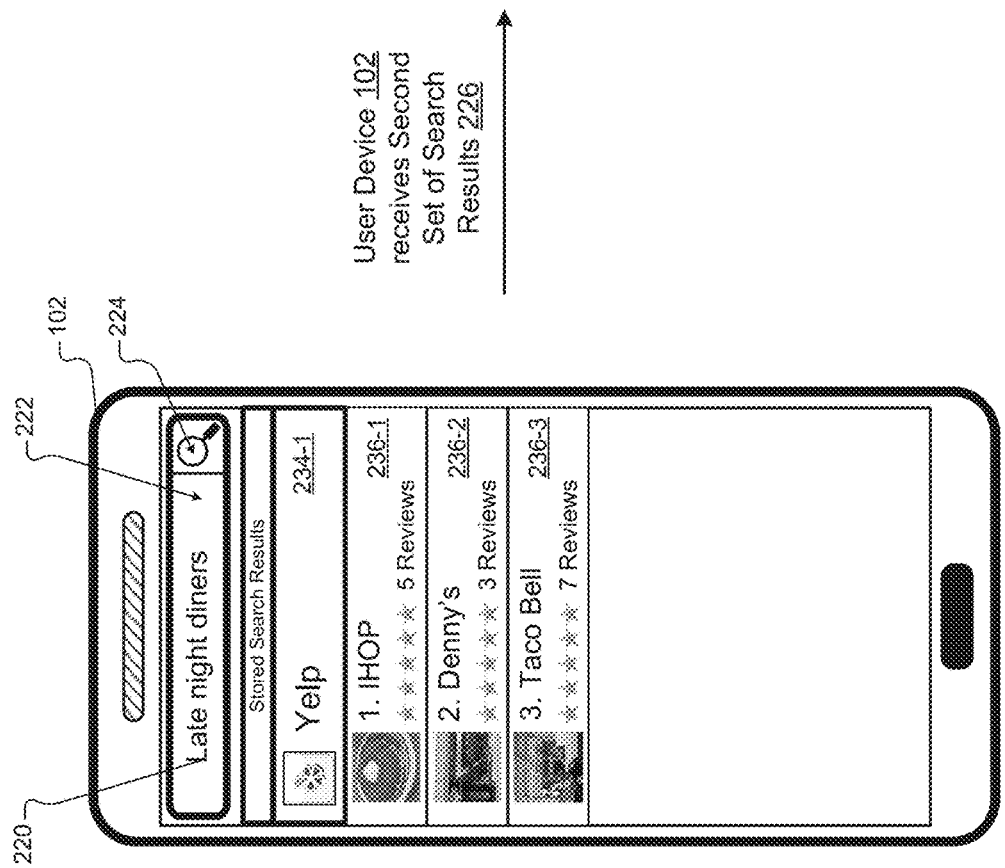
FIG. 7B
FIG. 7A

STORING PREDICTED SEARCH RESULTS ON A USER DEVICE BASED ON SOFTWARE APPLICATION USE

CROSS-REFERENCE TO RELATED APPLICATION

This application claims priority under 35 U.S.C. § 119(e) to U.S. Provisional Application 62/098,899, filed Dec. 31, 2014, which is hereby incorporated by reference in its entirety.

TECHNICAL FIELD

This disclosure generally relates to the field of search, and more particularly to techniques for generating predicted search results for use in performing searches on user devices.

BACKGROUND

In recent years, the use of computers, smartphones, and other Internet-connected computing devices has grown significantly. Correspondingly, the number of software applications (apps) available for such computing devices has also grown. Today, many diverse apps can be accessed on a number of different computing devices, including, but not limited to, smartphones, personal computers, automobiles, and televisions. These apps can include business driven apps, games, educational apps, news apps, shopping apps, messaging apps, media streaming apps, and social networking apps, as some examples. Because of the large number of apps available today and the wide range of functionality they provide, computing device users often require the ability to search for and access specific app functionality.

SUMMARY

In one example, a method includes transmitting, using a user device, a request to a search system. In this example, the request indicates one or more native applications that are installed on the user device. The method includes receiving a first set of search results from the search system at the user device in response to transmitting the request. In this example, each search result of the first set includes an app access mechanism (AAM) that references one of the one or more native apps and indicates one or more operations for the native app to perform. The method further includes receiving a search query from a user at the user device, identifying, using the user device, one or more search results of the first set of search results using the search query, transmitting, using the user device, the search query to the search system, and receiving a second set of search results from the search system at the user device in response to transmitting the search query. In this example, the first and second sets of search results are different. The method also includes displaying the identified one or more search results of the first set of search results and the second set of search results at the user device.

In another example, a method includes receiving a request from a user device. In this example, the request indicates one or more native apps that are installed on the user device. The method includes identifying a first set of function records using the request. In this example, each function record of the first set includes an AAM and app state information (ASI). The AAM references a native app and indicates one or more operations for the native app to perform. The ASI describes a state of the native app after the native app has performed the one or more operations. Also in this example, identifying the first set of function records using the request includes determining that the AAM included in each function record of the first set references one of the one or more native apps indicated by the request. The method includes selecting a first one or more AAMs from the first set of function records, and transmitting the first one or more AAMs to the user device. The method further includes receiving a search query from the user device, and identifying a second set of function records using the search query. In this example, each function record of the second set includes an AAM and ASI. The AAM references a native app and indicates one or more operations for the native app to perform. The ASI describes a state of the native app after the native app has performed the one or more operations. The method also includes selecting a second one or more AAMs from the second set of function records, and transmitting the second one or more AAMs to the user device.

In another example, a system includes one or more computing devices configured to transmit, using a user device, a request to a search system. In this example, the request indicates one or more native apps that are installed on the user device. The one or more computing devices are configured to receive a first set of search results from the search system at the user device in response to transmitting the request. In this example, each search result of the first set includes an AAM that references one of the one or more native apps and indicates one or more operations for the native app to perform. The one or more computing devices are further configured to receive a search query from a user at the user device, identify, using the user device, one or more search results of the first set of search results using the search query, transmit, using the user device, the search query to the search system, and receive a second set of search results from the search system at the user device in response to transmitting the search query. In this example, the first and second sets of search results are different. The one or more computing devices are also configured to display the identified one or more search results of the first set of search results and the second set of search results at the user device.

In another example, a system includes one or more computing devices configured to receive a request from a user device. In this example, the request indicates one or more native apps that are installed on the user device. The one or more computing devices are configured to identify a first set of function records using the request. In this example, each function record of the first set includes an AAM and ASI. The AAM references a native app and indicates one or more operations for the native app to perform. The ASI describes a state of the native app after the native app has performed the one or more operations. Also in this example, to identify the first set of function records using the request, the one or more computing devices are configured to determine that the AAM included in each function record of the first set references one of the one or more native apps indicated by the request. The one or more computing devices are configured to select a first one or more AAMs from the first set of function records, and transmit the first one or more AAMs to the user device. The one or more computing devices are further configured to receive a search query from the user device, and identify a second set of function records using the search query. In this example, each function record of the second set includes an AAM and ASI. The AAM references a native app and indicates one or more operations for the native app to perform. The ASI describes a state of the native app after the native app has performed the one or more operations. The one or more computing devices are also configured to select a second one or more AAMs from the second set of function records, and transmit the second one or more AAMs to the user device.

In another example, a non-transitory computer-readable storage medium includes instructions that cause one or more computing devices to transmit, using a user device, a request to a search system. In this example, the request indicates one or more native apps that are installed on the user device. The instructions cause the one or more computing devices to receive a first set of search results from the search system at the user device in response to transmitting the request. In this example, each search result of the first set includes an AAM that references one of the one or more native apps and indicates one or more operations for the native app to perform. The instructions further cause the one or more computing devices to receive a search query from a user at the user device, identify, using the user device, one or more search results of the first set of search results using the search query, transmit, using the user device, the search query to the search system, and receive a second set of search results from the search system at the user device in response to transmitting the search query. In this example, the first and second sets of search results are different. The instructions also cause the one or more computing devices to display the identified one or more search results of the first set of search results and the second set of search results at the user device.

In another example, a non-transitory computer-readable storage medium includes instructions that cause one or more computing devices to receive a request from a user device. In this example, the request indicates one or more native apps that are installed on the user device. The instructions cause the one or more computing devices to identify a first set of function records using the request. In this example, each function record of the first set includes an AAM and ASI. The AAM references a native app and indicates one or more operations for the native app to perform. The ASI describes a state of the native app after the native app has performed the one or more operations. Also in this example, the instructions that cause the one or more computing devices to identify the first set of function records using the request include instructions that cause the one or more computing devices to determine that the AAM included in each function record of the first set references one of the one or more native apps indicated by the request. The instructions cause the one or more computing devices to select a first one or more AAMs from the first set of function records, and transmit the first one or more AAMs to the user device. The instructions further cause the one or more computing devices to receive a search query from the user device, and identify a second set of function records using the search query. In this example, each function record of the second set includes an AAM and ASI. The AAM references a native app and indicates one or more operations for the native app to perform. The ASI describes a state of the native app after the native app has performed the one or more operations. The instructions also cause the one or more computing devices to select a second one or more AAMs from the second set of function records, and transmit the second one or more AAMs to the user device.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-8B depict example graphical user interfaces (GUIs) that may be generated and displayed on a user device according to the present disclosure.

DETAILED DESCRIPTION

Figure 1:
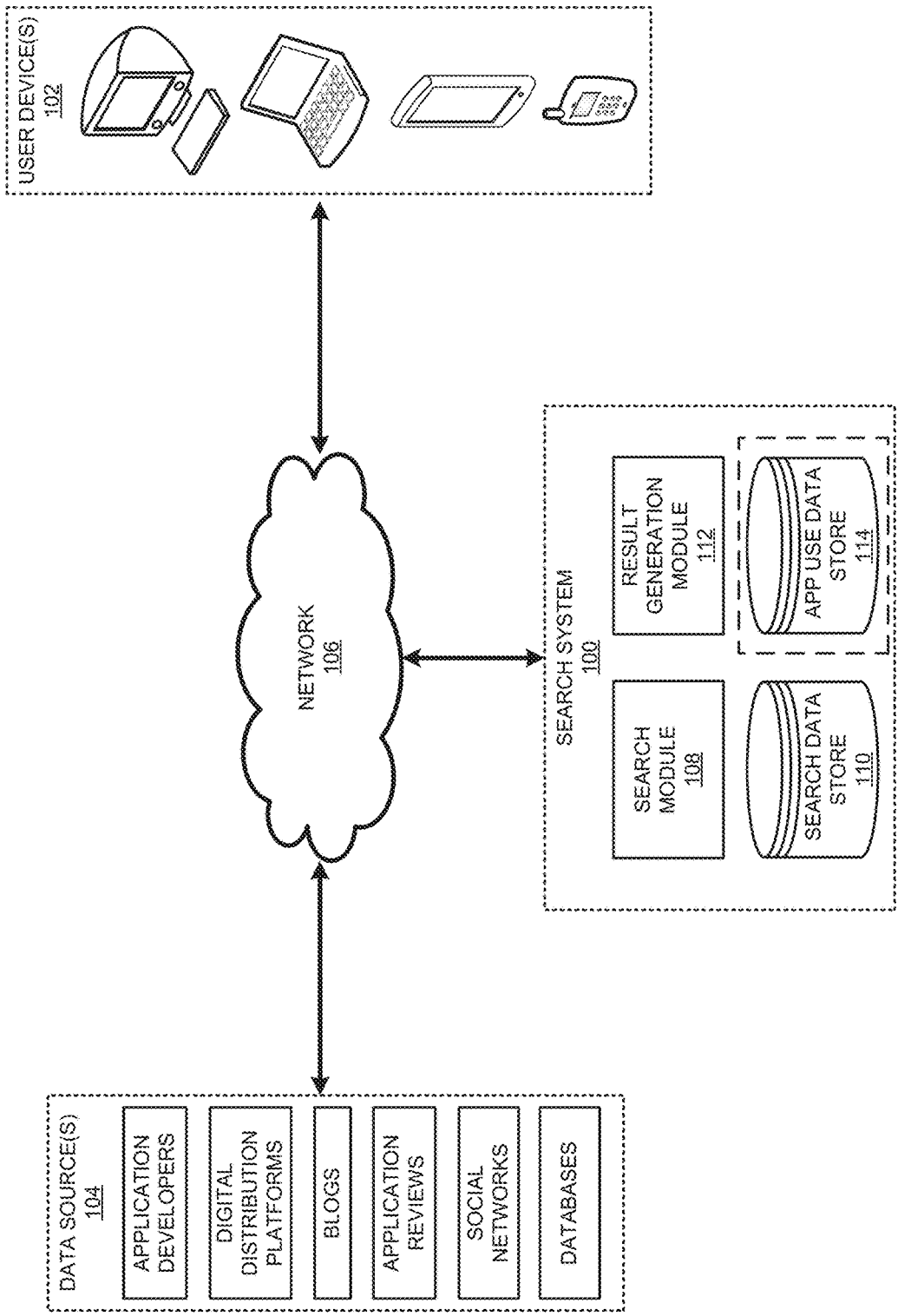
FIG. 1 depicts an example environment that includes a search system, one or more user devices, and one or more data sources in communication via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for storing (e.g., "pre-caching") predicted, or likely, search results on user devices prior to users of the devices performing searches via the devices. Specifically, the techniques described herein are directed to a user device and a search system that are configured to enable a user to enter a search query into a search field of a software search application (app) (e.g., a search engine) included on the device and retrieve search results that are responsive to the query with relatively short latency or delay. In particular, the disclosed techniques may enable the user to retrieve predicted search results that are likely responsive to the search query and which are stored, or pre-cached, locally on the user device for relatively quick retrieval. The techniques may also enable the user to retrieve supplemental search results that are responsive to the search query from the search system, which may require relatively more time to retrieve.

According to the disclosed techniques, a user device (e.g., a mobile computing device, such as a smartphone, or a tablet) may transmit a request (e.g., data) to a search system. The request may indicate one or more native apps that are installed on the user device (e.g., that have been recently and/or frequently used by a user on the device). The user device may receive a first set of search results from the search system in response to transmitting the request. Each search result of the first set may include an app access mechanism (AAM) that references one of the native apps that are installed on the user device and indicates one or more operations for the app to perform. For example, the AAM may specify a state of the native app. In this example, the native app performing the operations may set the app into the state. In some examples, upon receiving the first set of search results from the search system, the user device indexes the results, such that each result is searchable on the device using a search query entered into the device. The user device may then store the indexed first set of search results on the device.

The user device may further receive a search query (e.g., a text string) from the user. For example, the user may enter the search query into a search field, or "search bar," of a search app executing on the user device. The user device may identify one or more of the first set of search results using the search query. For example, the user device may identify the one or more of the first set of search results based on matches between terms of the search query and terms included in the identified results. The user device may then transmit the search query to the search system and receive a second, different, set of search results from the system in response to transmitting the query. For example, the second set of search results may include one or more AAMs that each reference a native app and indicate one or more operations for the app to perform, in a similar manner as described above. In some examples, the second set of search results also includes other content (e.g., native apps, audio, video, and/or documents). In any case, the user device may display the identified one or more of the first set of search results and the second set of search results to the user (e.g., as user selectable links).

In some examples, the request transmitted by the user device to the search system further indicates a geographic location (e.g., GPS coordinates) of the device. In these examples, in addition to the AAM included in each of the first set of search results referencing one of the native apps that are installed on the user device and indicating one or more operations for the app to perform, the state specified by the AAM may also be associated with the geographic location of the user device. For example, the state may indicate a product, service, or event that is available or occurring within the geographic location of the user device.

In other examples, the user device may further transmit an autosuggest request to the search system and receive autosuggest data from the system in response to transmitting the autosuggest request. The autosuggest data may include one or more likely search queries (e.g., text strings) that are associated with the native apps that are installed on the user device and indicated by the request described above (e.g., with states of the apps, including the states specified by the AAMs included in the first set of search results). In still other examples, the user device may locally generate the autosuggest data by accessing the states specified by the AAMs included in the first set of search results. In any case, in these examples, to receive the search query from the user, the user device may receive the query using the autosuggest data (e.g., by auto-completing at least a part of the query using the autosuggest data).

In some examples, each of the identified search results of the first set of search results and the second set of search results include a result score associated (e.g., received) with the respective result. The result score may indicate a rank of the search result relative to one or more other ones of the identified search results of the first set of search results and the second set of search results. In these examples, to display the search result to the user, the user device may arrange the result in an order along with one or more other ones of the identified search results of the first set of search results and the second set of search results based on the result score. In some examples, the user device further modifies one or more of the result scores associated with the first set of search results based on (e.g., result relevance to) the search query. In other examples, to display the identified search results of the first set of search results and the second set of search results to the user, the user device may display an indication that the identified search results of the first set of search results are different than the second set of search results.

Also according to the disclosed techniques, the search system may receive the request from the user device. As described herein, the request may indicate one or more native apps that are installed on the user device (e.g., that have been recently and/or frequently used by a user on the device). The search system may identify a first set of function records using the request. Each function record of the first set may include an AAM and ASI. The AAM may reference a native app and indicate one or more operations for the app to perform. The ASI may describe a state of the native app after the app has performed the operations. For example, the AAM may specify the state of the native app. In this example, the native app performing the operations may set the app into the state. To identify the first set of function records using the request, the search system may determine that the AAM included in each record of the first set references one of the native apps indicated by the request. The search system may then select a first one or more AAMs from the first set of function records and transmit the first AAMs to the user device.

The search system may further receive the search query from the user device. The search system may identify a second, different, set of function records using the search query. Each function record of the second set may include an AAM and ASI, in a similar manner as described above. In some examples, to identify the second set of function records using the search query, the search system identifies each record based on matches between terms of the query and terms of the ASI included in the identified record. The search system may then select a second one or more AAMs from the second set of function records and transmit the second AAMs to the user device. In some examples, the search system transmits other content to the user device (e.g., native apps, audio, video, and/or documents) with the second AAMs.

In some examples, the request received by the search system from the user device indicates a geographic location of the user device, as described above. In these examples, to identify the first set of function records using the request, in addition to determining that the AAM included in each record references one of the native apps indicated by the request, the search system may further determine that the state specified by the AAM is associated with the geographic location. For example, the search system may determine that the state indicates a product, service, or event that is available or occurring within the geographic location.

In other examples, the search system may further receive an autosuggest request from the user device and generate autosuggest data in response to receiving the autosuggest request. As described above, the autosuggest data may include one or more likely search queries that are associated with the native apps indicated by the request described above (e.g., with states of the apps, including the states specified by the AAMs included in the first set of function records). In any case, the search system may then transmit the autosuggest data to the user device.

In still other examples, each of the first and second sets of function records may further include (e.g., have generated for the record) a result score associated with the AAM included in the record. The result score may indicate a rank of the AAM relative to one or more other AAMs included in the first and second sets of function records. In these examples, the search system may select the result score from each of one or more of the first and second sets of function records and transmit the selected results scores to the user device. As described herein, the user device may use the result scores to display the first and second AAMs to the user, e.g., by arranging the corresponding user selectable links in an order based on the result scores.

In this manner, the techniques of the present disclosure may, in some examples, enable a user of a user device to receive predicted search results that are likely responsive to the user's search query with relatively low latency or delay compared to other techniques. As described herein, the predicted search results may be generated based on the user's past use (e.g., the frequency of the use) of one or more native apps that are installed on the user device. As also described herein, the predicted search results may be stored locally, or pre-cached, on the user device for relatively quick retrieval using the search query. The techniques may also enable the user to receive supplemental search results that are responsive to the user's search query from the search system (e.g., automatically, or in the event the predicted search results are insufficiently responsive to the query), which may require relatively more time to retrieve.

FIG. 1 is a functional block diagram that illustrates an example environment that includes a search system 100 and one or more user devices 102 and data sources 104 that communicate with one another via a network 106. The network 106 through which these systems, devices, and sources communicate may include any type of network, such as, e.g., a local area network (LAN), a wide area network (WAN), and/or the Internet.

In the example of FIG. 1, the user device 102 transmits a request to the search system 100. The search system 100 receives the request from the user device 102 and generates a first set of one or more search results in response to receiving (e.g., based on) the request. The search system 100 then transmits the first set of search results to the user device 102. Upon receiving the first set of search results, the user device 102 indexes the first set of search results and stores the indexed first set of search results on the user device 102. Subsequently, the user device 102 receives a search query from a user of the user device 102. The user device 102 identifies one or more of the first set of search results in response to receiving (e.g., based on) the search query and displays the identified one or more of the first set of search results on the user device 102 (e.g., as one or more user selectable links). The user device 102 then transmits the search query to the search system 100. The search system 100 receives the search query from the user device 102 and generates a second set of one or more search results in response to receiving (e.g., based on) the search query. The search system 100 then transmits the second set of search results to the user device 102. Upon receiving the second set of search results, the user device 102 displays the second set of search results on the user device 102 (e.g., as one or more user selectable links) along with the identified one or more of the first set of search results.

The request may include data indicating one or more native apps that are installed on the user device 102. For example, the request may indicate one or more native apps that have been recently (e.g., frequently) used by the user on the user device 102. As such, the request may indicate one or more native apps that are installed on the user device 102 and/or whether (and, e.g., how often) the apps have been used by the user on the user device 102. The search query may include text, numbers, and/or symbols (e.g., punctuation) entered into the user device 102 by the user. The user may have entered the search query into a search field, or "box," of a search app included on the user device 102 (e.g., using a touchscreen keypad, a mechanical keypad, and/or via speech recognition techniques). In some examples, the search app is a native app dedicated to search, or a more general app, such as a web browser app.

In some examples, the user device 102 transmits additional data to the search system 100 along with the request and/or the search query. As one example, in addition to indicating native apps that are installed on the user device 102 and whether (e.g., how often) the user uses the apps, the request may further include geo-location data indicating a geographic location of the user device 102 and/or platform data indicating a platform (e.g., an operating system (OS), or a device type) associated with the user device 102. As another example, the search query may be transmitted along with the geo-location and/or platform data. The search query and any additional data may be referred to herein as a query wrapper. In some examples, the query wrapper further indicates a web browser app included on the user device 102, an identity of the user (e.g., a username), partner specific data, and other data. The user device 102 may transmit the request and the query wrapper to the search system 100, as described herein. The search system 100 may use the request, search query, and/or additional data included in the query wrapper to generate the first and second sets of search results, as also described herein.

As described herein, the search system 100 receives the request and search query from the user device 102 and generates the first and second sets of search results in response to receiving the request and query. For example, with reference to FIG. 2, the search system 100 may include a search module 108, a search data store 110 (hereinafter, the "data store 110"), a result generation module 112, and an app use data store 114 (hereinafter, the "data store 114"). The search module 108 may receive the request or the search query from the user device 102 and identify one or more function records included in the data store 110 using the request or query. In the case of the search query, initially, the search module 108 may analyze the query. For example, the search module 108 may perform any of tokenization, filtering, stemming, synonymization, and stop word removal with respect to the search query. The search module 108 may then identify the function records included in the data store 110 based on the analyzed search query. For example, the search module 108 may identify the function records based on (e.g., text) matches between terms of the search query and terms included in the identified records. In the case of the request, the search module 108 may identify the function records included in the data store 110 based on the request. For example, the search module 108 may identify function records that specify states of native apps that are installed on the user device 102 (and, e.g., which have been recently and/or often used by the user on the user device 102), as indicated by the request. For example, the search system 100 may store the data included in the request in the data store 114. In any case, the search module 108 may then process (e.g., score) the identified function records. For example, the search module 108 may determine how well the function records match the request or the search query. The search module 108 may then select one or more of the identified function records that best match the request or search query and transmit one or more function identifiers (IDs) indicating the selected records to the result generation module 112. The result generation module 112 may identify the function records selected by the search module 108 in the data store 110 using the received function IDs, generate the first and second sets of search results using the identified records, and transmit the first and second sets of search results to the user device 102, as described herein.

In some examples, the result generation module 112 generates the first and/or second sets of search results such that the results specify one or more app states of native or web-based apps. For example, upon identifying the function records selected by the search module 108 in the data store 110 using the received function IDs, the result generation module 112 may select one or more access mechanisms (AMs) from the identified records. An AM, as used herein, may refer to a string (e.g., one or more characters) that references a native or web-based app and indicates one or more operations for the app to perform. Upon performing the operations, the app may be set into a particular state (e.g., where the app displays a GUI, or a so-called "screen," or a web page). Stated another way, an AM of this disclosure specifies an app state of a native or web-based app. In some examples, the result generation module 112 transmits the selected AMs to the user device 102 as part of the first and/or second sets of search results. In other examples, the result generation module 112 may transmit the function IDs that correspond to the function records from which the AMs were selected to the user device 102 as part of the first and/or second sets of search results. In these examples, the user device 102 may access the function records in the data store 110 using the received function IDs and select the AMs from the records. In any case, upon receiving the first and/or second sets of search results, the user device 102 may display one or more of the results, including the AMs, to the user of the user device 102 (e.g., as one or more user selectable links).

In this disclosure, an app may refer to computer software that causes a computing device (e.g., one of the user device(s) 102) to perform a task. In some examples, an app is referred to as a "program." Example apps include word processing apps, spreadsheet apps, messaging apps, media streaming apps, social networking apps, and games. Apps can be executed on a variety of different computing devices, including mobile computing devices, such as smartphones, tablets, and wearable computing devices (e.g., headsets and/or watches). Apps can also be executed on computing devices having other form factors, such as laptop or desktop computers, or other consumer electronic devices. In some examples, apps are installed on a computing device prior to a user purchasing the device. In other examples, the user may download and install apps on the computing device after purchasing the device. In this disclosure, a native app may refer to an app that is used by installing the app on a user device and a web-based app may refer to an app that is accessible from a user device via a web browser app.

A single app can provide different functionalities. For example, a restaurant reservation app can access reviews for a variety of different restaurants and set up reservations at the restaurants. Similarly, a travel app can book hotels, book flights, and provide reviews for different travel destinations. The different functionalities associated with a single app may be accessed using different AMs. For example, with respect to the restaurant reservation app, the data store 110 may include function records having different AMs for accessing different restaurant reviews and setting up reservations. Additionally, with respect to the travel app, the data store 110 may include function records having different AMs for booking hotels, booking flights, and accessing reviews for different travel destinations.

An AM, as described herein, may include one of a native app AM (hereinafter, "app AM," or "AAM") and a web AM (hereinafter. "WAM"). As such, the user device 102 may use an AM of the present disclosure to access functionality provided by (e.g., an app state of) a native or a web-based app. For example, the user may select a user selectable link that includes the AM to access the functionality (e.g., the app state) of the native or web-based app indicated in the link. An AAM may reference a native app and indicate one or more operations for the app to perform, as described herein. A WAM may include a resource identifier that references a web resource (e.g., a web page of a web-based app). For example, the WAM may include a URL (e.g., a web address for a mobile-optimized site and/or a full site) used with the hypertext transfer protocol (HTTP). If the user selects a user selectable link that includes the WAM, the user device 102 may launch a web browser app included on the device 102, and retrieve the web resource indicated in the resource identifier. Stated another way, if the user selects the user selectable link that includes the WAM, the user device 102 may launch the web browser app and access an app state (e.g., a web page) of a web-based app.

In other examples, the search module 108, data store 110, and result generation module 112 may be configured to generate the first and/or second sets of search results such that the results specify information other than app states of native or web-based apps. For example, the search module 108, data store 110, and result generation module 112 may generate the first and/or second sets of search results such that the results reference one or more web pages, documents, images, songs, videos, podcasts, or other data. As described herein, upon receiving the first and/or second sets of search results from the search system 100 (e.g., from the result generation module 112), the user device 102 may display one or more of the results to the user.

The data store 110 may include one or more databases, indices (e.g., inverted indices), tables, files, or other data structures that may be used to implement the techniques of this disclosure. In some examples, the data store 110 is included in one or more storage devices. As described herein, in some examples, the data store 110 includes one or more function records that each include data related to a state of a native and/or web-based app (e.g., an AM, such as an AAM or a WAM). In these examples, the search system 100 (e.g., the search module 108 and result generation module 112) may use the function records included in the data store 110 to generate the first and second sets of search results that specify states of native and/or web-based apps. Additionally, or alternatively, the data store 110 may include other information enabling the search system 100 (e.g., the search module 108 and result generation module 112) to generate search results that specify other content (e.g., native apps, web pages, documents, images, songs, videos, podcasts, and various other types of data), as also described herein.

In some examples, the search system 100 (e.g., the result generation module 112) transmits additional data to the user device 102 with the first and second sets of search results. As one example, the search module 108 may generate one or more result scores for the identified function records (e.g., as part of processing the records, as described above). For example, the search module 108 may generate the result scores for the function records using values of metrics associated with persons, places, and/or things described in the records. As a result, each identified function record may be associated with a result score that indicates a rank of the record relative to the other identified function records. As another example, for each of the first and second sets of search results, the search system 100 (e.g., the search module 108) may generate a ranking value that indicates a rank of the result relative to the other search results. In any case, the search system 100 may transmit the result scores or ranking values to the user device 102 with the first and second sets of search results (e.g., with one or more AMs and, e.g., other information related to one or more web pages, documents, images, songs, videos, podcasts, and other data). The user device 102 may use the result scores or ranking values to display one or more user selectable links generated for the first and second sets of search results by the user device 102 (e.g., to order the links within a list).

In some examples, the search system 100 (e.g., the result generation module 112) transmits the first and second sets of search results to the user device 102 with link (e.g., text and/or image) data. In these examples, to display one or more of the first and second sets of search results to the user, the user device 102 may generate one or more user selectable links for the results using the link data and display the links on the device 102 (e.g., on a display of the device 102). Each user selectable link may be associated with one of the first and second sets of search results, such that when the user selects the link, the user device 102 accesses the result (e.g., sets a native or web-based app into an app state, or accesses a web page, document, image, song, video, podcast, or other data). Each link may also include text and/or image data that is displayed to the user as part of the link. The text and/or image data may indicate to the user the action that the user device 102 performs in response to the user selecting the link. The text and/or image data may also describe the corresponding search result. In some examples, if the link is for an app state of a native or web-based app, the text and/or image data indicates that the user device 102 will launch the app (e.g., directly, or via a web browser app), and that the app will be set into the app state, when the user selects the link. The text and/or image data may also describe the app state. In other examples, if the link is for a web page, document, image, song, video, podcast, or other data, the text and/or image data may indicate one or more of a name, a description, a web address (e.g., a URL), and at least a portion of the content of the web page, document, image, song, video, podcast, or other data.

As described above, upon receiving the first and second sets of search results from the search system 100, the user device 102 may render one or more of the results as user selectable links and display the links to the user on the device 102 (e.g., on a display of the device 102). The user device 102 may then receive selections of one or more of the user selectable links from the user. In response to the user selecting a particular user selectable link for a search result that includes an AM (i.e., a result that specifies an app state of a native or web-based app), the user device 102 may launch a native or web-based app referenced by the AM and cause the app to perform one or more operations indicated by the AM to set the app into a particular app state. For example, upon being set into the app state, the app may be configured to display one or more products, services, or vendors, to the user. In response to the user selecting a user selectable link for a search result that does not specify an app state of an app, the user device 102 may access a web page, document, image, song, video, podcast, or other data (e.g., via a web browser app of the device 102), as described herein.

The data store 114 may include one or more databases, indices (e.g., inverted indices), tables, files, or other data structures that may be used to implement the techniques of this disclosure. In some examples, the data store 114 is included in one or more storage devices. In general, the data store 114 includes data that enables the search system 100 to determine one or more native apps that are installed on the user device 102. In some examples, the data further indicates whether and/or how often a user of the user device 102 has recently used one or more of the native apps on the user device 102, as described above. For example, the search system 100 may receive the data from the user device 102 as one or more requests (e.g., one or more indications) and store the data in the data store 114, as also described above.

The user device(s) 102 may be any computing devices capable of providing requests and search queries to the search system 100 and receiving first and second sets of search results from the system 100. The user device(s) 102 may include smartphones, and tablet, laptop, or desktop computers. The user device(s) 102 may also include computing devices having other form factors, e.g., computing devices included in vehicles, gaming devices, televisions, or other appliances (e.g., networked home automation devices and home appliances).

The user device(s) 102 may use a variety of different operating systems or platforms. In an example where a user device 102 is a mobile device, the device 102 may operate using an OS, such as ANDROID® by Google, Inc., IOS® by Apple. Inc., or WINDOWS PHONE® by Microsoft Corporation. In an example where the user device 102 is a laptop or desktop computing device, the device 102 may use an OS, such as MICROSOFT WINDOWS® by Microsoft Corporation, MAC OS® by Apple, Inc., or LINUX® (LINUX® is the registered trademark of Linus Torvalds in the U.S. and other countries). The user device(s) 102 may also interact with the search system 100 using operating systems other than those described herein.

The user device(s) 102 may communicate with the search system 100 via the network 106. In general, the user device(s) 102 may communicate with the search system 100 using any app that can transmit requests and search queries to the search system 100 and receive first and second sets of search results from the system 100. In some examples, the user device 102 includes an app that is dedicated to interfacing with the search system 100, such as an app dedicated to searches (e.g., a search app). In other examples, the user device 102 may communicate with the search system 100 using a more general app, such as a web browser app. In any case, an app included on the user device 102 to communicate with the search system 100 may include a GUI that includes a search field, or box, into which the user of the device 102 may enter search queries, e.g., using a touchscreen, physical keyboard, a speech-to-text program, or other form of user input available on the device 102.

A user device 102 may use a GUI of a search app, or a more general app, included on the device 102 to display the first and second sets of search results to the user. The user device 102 may also use the GUI to receive search queries from the user and to transmit requests and the queries to the search system 100. The GUI may display the first and second sets of search results to the user in various different ways, depending on information transmitted to the user device 102 from the search system 100. In examples where the first and second sets of search results include one or more AMs (e.g., AAMs, WAMs, and/or ADAs), the search system 100 may transmit the AMs to the user device 102 with link data used to generate one or more user selectable links for the AMs. In some examples, the GUI displays the first and second sets of search results to the user as a list of the links, including text and/or images. For example, the text and/or images may include names of apps specified by the AMs, descriptions of the AMs and/or operations indicated therein, and images associated with the apps, or app states thereof, referenced by the AMs (e.g., app, or app state, icons or screens). In some examples, the GUI displays the first and second sets of search results as the list of the links arranged under a search field into which the user has entered a search query. The GUI may arrange the links by result scores associated with the links, i.e., with the AMs for which the links are generated, or using other logic. In other examples, the GUI may group the links by native app.

The data source(s) 104 may be sources of data, which the search system 100 may use to generate and/or update the data store 110. For example, the search system 100 may use the data source(s) 104 to generate and/or update one or more databases, indices, tables, files, or other data structures included in the data store 110. The search system 100 may generate new function records and/or update existing function records based on data retrieved from the data source(s) 104. For example, the search system 100 may include modules that generate new function records and/or update existing function records based on the data retrieved from the data source(s) 104. In some examples, some or all of the data included in the data store 110 (e.g., one or more function records) is manually generated by a human operator.

The data source(s) 104 may include various different data providers. For example, the data source(s) 104 may include data from app developers, e.g., app developer websites and data feeds. The data source(s) 104 may also include operators of digital distribution platforms configured to distribute apps to user device(s) 102. The data source(s) 104 may further include other websites, such those that include web logs (i.e., blogs), app reviews, or other data related to apps. Additionally, the data source(s) 104 may include social networking sites, such as "FACEBOOK®" by Facebook, Inc. (e.g., Facebook posts) and "TWITTER®" by Twitter, Inc. (e.g., text from tweets). The data source(s) 104 may also include online databases including data related to movies, television programs, music, and restaurants. The data source(s) 104 may include other types of data sources having various content and update rates.

In some examples, the search system 100 retrieves data from the data source(s) 104, including any type of data related to app functionality and/or states. The search system 100 may generate one or more function records stored in the data store 110 based on the data. In other examples, some or all of the data included in the function records (e.g., ASI) may be manually generated by a human operator. The data included in the function records may be updated over time so that the search system 100 provides up-to-date search results.

Figure 2:
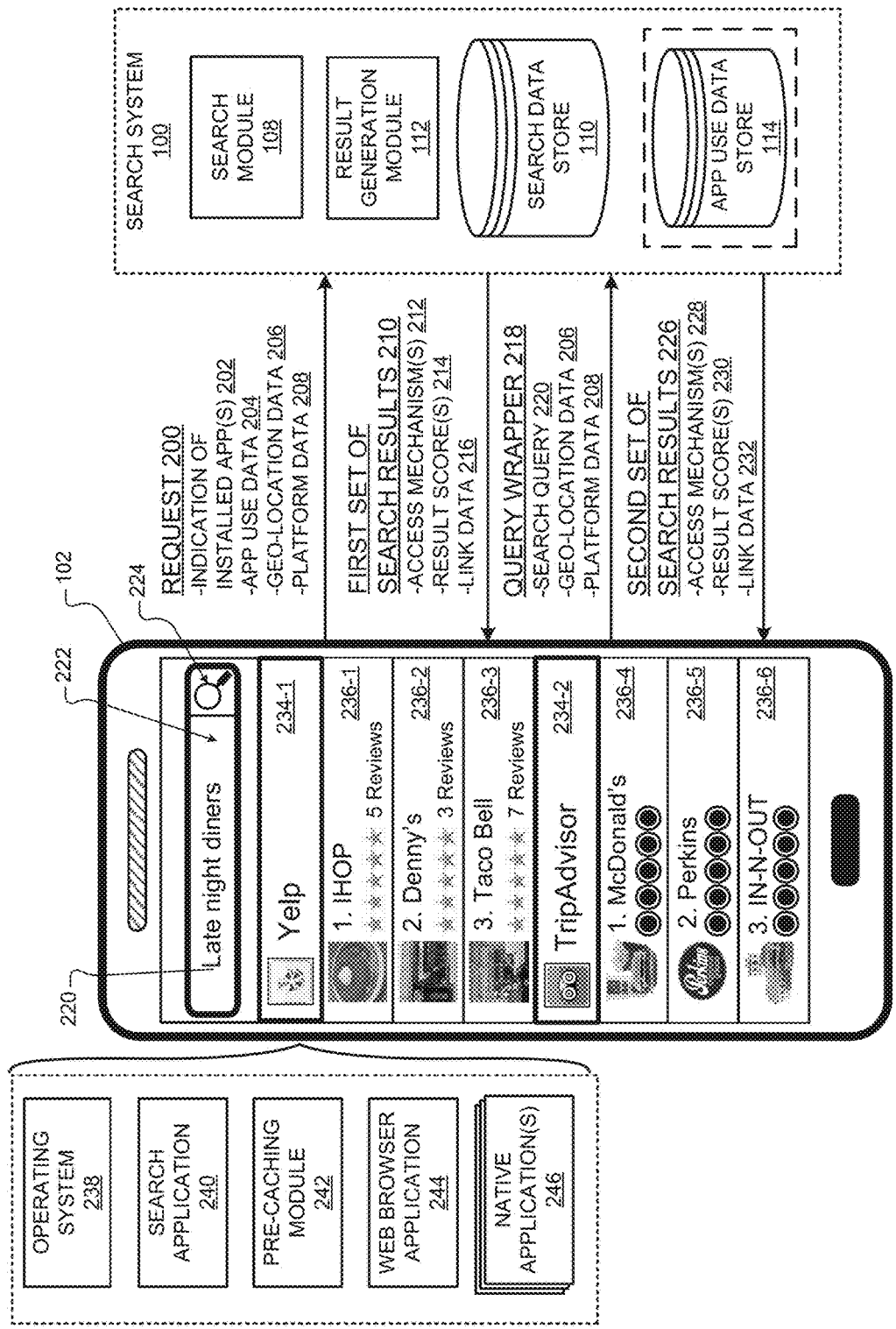
FIG. 2 depicts an example user device in communication with an example search system according to the techniques of this disclosure.

FIG. 2 illustrates an example user device 102 in communication with an example search system 100, consistent with the techniques of this disclosure. As shown in FIG. 2, the user device 102 includes an OS 238, a search app 240, a pre-caching module 242, a web browser app 244, and one or more native apps 246. The OS 238 may be software configured to enable the user device 102 to perform the functions attributed to the device 102 herein. The search app 240 may be a native or web-based app configured to transmit requests to the search system 100, receive first sets of search results from the system 100 in response to transmitting the requests, receive search queries from users of the user device 102, transmit the queries to the system 100, and receive second sets of search results from the system 100 in response to transmitting the queries. The pre-caching module 242 may facilitate the above-described steps of transmitting the requests and receiving the first sets of search results performed by the search app 240. The web browser app 244 may be a native app configured to enable the user device 102 to access web resources (e.g., via WAMs, such as URLs, or other web addresses or resource identifiers). The native app(s) 246 may be one or more native apps that are installed on the user device 102.

In the example of FIG. 2, the user device 102 initially transmits a request 200 to the search system 100 (e.g., prior to receiving a search query 220 from a user of the device 102). The request 200 may indicate one or more native apps 202 that are installed on the user device 102 (e.g., one or more of the native app(s) 246). The request 200 may further include app use data 204 indicating whether the native apps 202 have been recently (e.g., frequently) used by the user on the device 102, geo-location data 206 indicating a geographic location of the device 102, and platform data 208 indicating an OS and/or a device type associated with the device 102. In some examples, the search system 100 stores the indication of the native apps 202 and/or the app use data 204 in the data store 114. The user device 102 then receives a first set of search results 210 from the search system 100 in response to transmitting the request 200 to the system 100. The first set of search results 210 may include one or more AMs 212 (e.g., AAMs, WAMs, and/or ADAs), result scores 214, and link data 216. In some examples, the AMs 212 specify one or more states of native apps or web resources that include dynamic (e.g., changing over time) content. For example, an AM 212 (e.g., a corresponding state) may specify a search for a particular topic (e.g., a news topic), a product, or a service, rather than results of the search itself. In these examples, upon the user selecting the one of the first set of search results 210 that includes the AM 212, the user device 102 may perform the search and retrieve the most recent search results associated with the topic, product, or service.

The user device 102 further transmits a query wrapper 218 to the search system 100 (e.g., upon receiving the search query 220 from the user). The query wrapper 218 may include the search query 220, geo-location data 206, platform data 208, and, e.g., other data (e.g., an IP address) associated with the user, the user device 102, and/or the query 220. As shown in FIG. 2, the user may have entered the search query 220 into a search field 222 of a GUI of the search app 240 executing on the user device 102. The user may have then caused the user device 102 to submit the query wrapper 218, including the search query 220, to the search system 100 by selecting (e.g., clicking on, or tapping) a search button 224 of the GUI. The user device 102 then receives a second set of search results 226 from the search system 100 in response to transmitting the query wrapper 218 (e.g., the search query 220) to the system 100. The second set of search results 226 includes one or more AMs 228 (e.g., AAMs, WAMs, and/or ADAs), result scores 230, link data 232, and other content (e.g., native apps, audio, video, and/or documents).

As shown in FIG. 2, the user device 102 displays the first and second sets of search results 210, 226 on a display of the device 102 as user selectable links 234-1, 234-2, 236-1, 236-2, 236-3, 236-4, 236-5, and 234-6 (collectively, the "links"). Each link includes link data (e.g., a portion of the link data 216 or 232), e.g., text (e.g., a name of an app, a name of an app state, and user review data) and an image (e.g., an icon for the app, app state, and user review data) that describe the one of the first and second sets of search results 210, 226 that is associated with the link. In the example of FIG. 2, the links 234-1 . . . 234-6 are associated with app states of, or entries in, native apps Yelp and TripAdvisor, which are described in greater detail below.

In this example, each of the links 234-1 . . . 234-6 may be associated with data, such that when the user selects the link, the user device 102 accesses the corresponding one of the first and second sets of search result 210, 226. In some examples, upon the user selecting a particular one of the links 234-1 . . . 234-6, the user device 102 launches a corresponding native app and set the app into an app state specified by the data (e.g., an AAM 212 or 228) included in the link. In other examples, upon the user selecting the link, the user device 102 may download and install a native app using the data (e.g., an ADA) included in the link. In still other examples, upon the user selecting the link, the user device 102 may access a web-page (e.g., via the web browser app 244) using the data (e.g., a WAM) included in the link. In additional examples, upon the user selecting the link, the user device 102 may access other content associated with the link (e.g., native apps, audio, video, and/or documents). The user device 102 may receive the data associated with the links 234-1 . . . 234-6 (e.g., the AAM(s) 212 and 228, ADAs, WAMs, and other content) as part of the first and second sets of search results 210, 226. As described herein, the links 234-1 . . . 234-6 may be generated using the link data 216 and 232 received as part of the first and second sets of search results 210, 226. As also described herein, the links 234-1 . . . 234-6 may be arranged for display to the user based on the result score(s) 214 and 230 also received as part of the first and second sets of search results 210, 226. In the example of FIG. 2, the user may select one or more of the links 234-1 . . . 234-6. Upon the user selecting a particular one of the links 234-1 . . . 234-6, the user device 102 may access the one of the first and second sets of search results 210, 226 that corresponds to the selected link in the manner described above.

Figure 3:
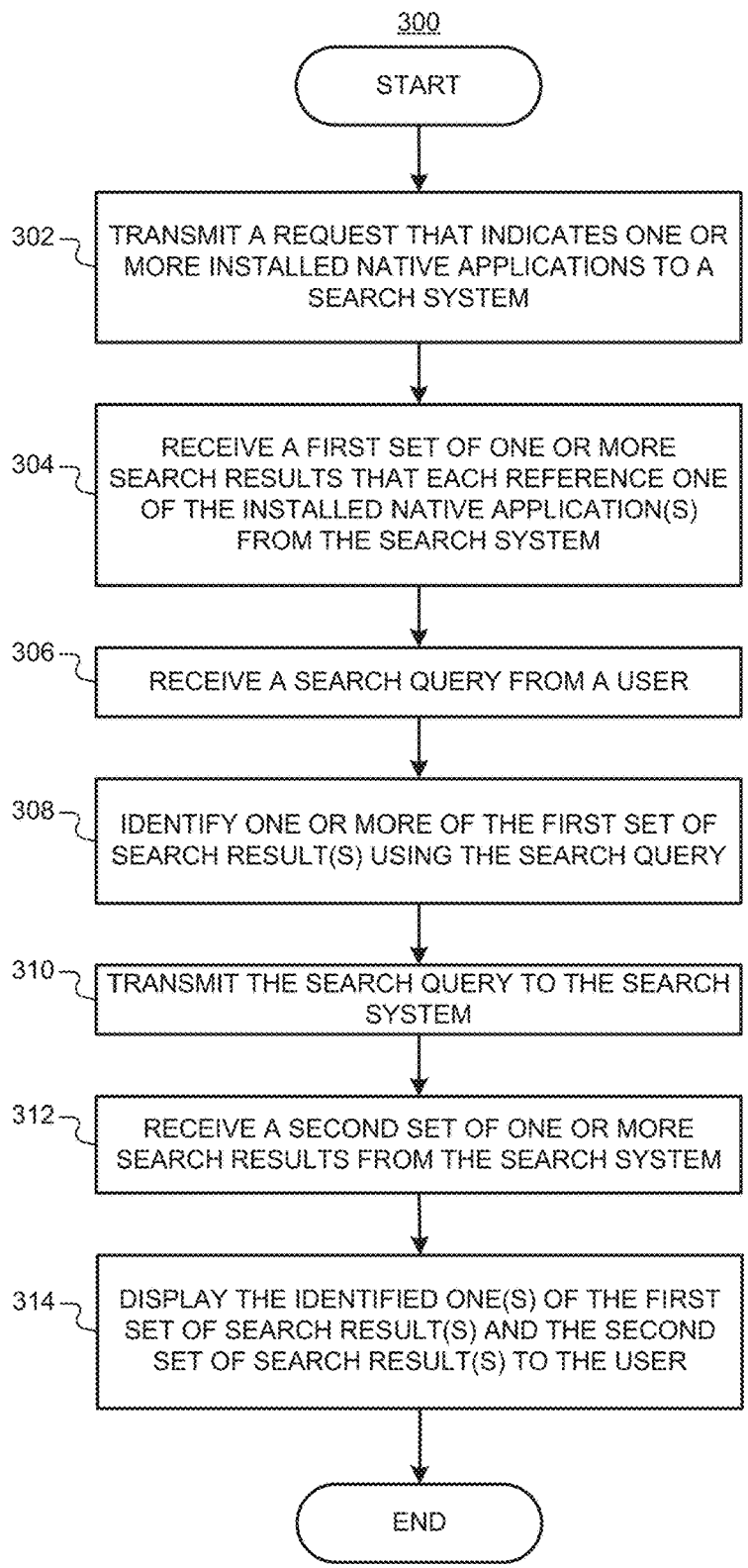
FIG. 3 is a flow diagram that illustrates an example method for generating predicted search results on a user device based on software applications installed on the user device.

FIG. 3 is a flow diagram that illustrates an example method 300 for generating predicted search results on a user device 102 based on one or more native apps that are installed on the device 102. The method 300 is described with reference to the search system 100, one of the user device(s) 102, and the various components thereof, as depicted in FIGS. 1-2. In block 302, the user device 102 transmits a request 200 indicating one or more native apps 202 (e.g., one or more of the native app(s) 246) that are installed on the device 102 to the search system 100. For example, the user device 102 may transmit the request 200 to the search system 100 prior to the device 102 receiving a search query 220 from a user of the device 102 and prior to the device 102 transmitting the query 220 to the system 100, as described below. In some examples, the native apps 202 indicated by the request 200 are one or more native apps that have been recently (e.g., frequently) used by the user on the user device 102.

In block 304, the user device 102 receives a first set of one or more search results 210 from the search system 100 in response to transmitting the request 200 to the system 100. In this example, each of the first set of search results 210 includes an AAM that references one of the native apps 202 and indicates one or more operations for the app 202 to perform. In other words, the AAM specifies a state of the native app 202, and the app 202 performing the operations sets the app 202 into the state. In some examples, the first set of search results 210 (e.g., the AAMs included therein) specifies one or more newest and/or most popular states in the native apps 202 indicated by the request 200 (e.g., states for default, or main pages of the apps 202). In other examples, the first set of search results 210 (e.g., the corresponding AAMs) may specify one or more states in the native apps 202 that are equivalent to one or more new and/or popular app states in one or more other native apps, e.g., those not installed on the user device 102.

In some examples, the request 200 further indicates a geographic location of the user device 102. In these examples, the state specified by the AAM included in each of the first set of search results 210 may be constrained to be within some (e.g., a predetermined) distance of the geographic location indicated by the request 200. The user device 102 may index the first set of search results 210 on the user device 102, such that each result 210 is (e.g., text) searchable on the device 102 using a search query 220 entered into the device 102. The user device 102 may store the indexed first set of search results 210 on the device 102.

In some examples, the search system 100 transmits the first set of search results 210 to the user device 102 as a compressed set of one or more so-called "short-results," which may minimize the amount of data, bandwidth, and/or time used to transmit the results 210. For example, each of the short-results may include one or more of the following components: (1) "match-string(s)," (2) "display string," (3) "App," (4) "trigger-action," (5) "score," and (5) "expire condition(s)." In this example, the match-string(s) indicate one or more text strings (e.g., search queries 220, such as "restaurants," "food," "thai," etc.) that the user may enter into the user device 102 to identify the corresponding short-result (e.g., as indexed and stored on the user device 102). The display string indicates a text string (e.g., "Yelp (App)," or "King of Thai Restaurant (Yelp)") that is shown when the short-result is identified and displayed to the user in the manner described above. The App indicates (e.g., via a text string) which of the native apps 202 is associated with the short-result, e.g., for selecting an icon for displaying the result upon the result being identified in the manner described above and/or for other purposes. The trigger-action indicates (e.g., via a text string) the action that the user device 102 takes when the user selects the short-result upon the result being identified and displayed. Example trigger-actions include "start Yelp (App)" (e.g., which may be written as an encoded command/directive), "open Yelp (App) to a page for a specific restaurant," and "Dial the contact named Mom." The score indicates a result score associated with the short-result and provides a way to sort (e.g., arrange) the result among other short-results and/or search results of the second set of search results 226. The optional expire-condition(s) may indicate when the short-result is to expire (e.g., a time or date at which the result is to be deleted from the user device 102 and/or be updated by another short-result). The expire-condition(s) may also indicate a geographic location or area associated with the user device 102 for which the short-result should be stored on the device 102.

In block 306, the user device 102 receives a search query 220 from the user. For example, the user may have entered the search query 220 into a search field 222 of a GUI of a search app 240 executing on the user device 102. In some examples (e.g., before receiving the search query 220), the user device 102 transmits an autosuggest request to the search system 100 and receive autosuggest data from the system 100 in response to transmitting the request. The autosuggest data may indicate one or more likely search queries that are associated with the native apps 202 indicated by the request 200. For example, the autosuggest data may indicate one or more search queries that are popular among users of the native apps 202. Additionally, or alternatively, the autosuggest data may indicate one or more search queries that are likely to match information (e.g., terms) included in states of the apps 202, such as, e.g., the states specified by the AAMs included in the first set of search results 210. In other examples, the user device 102 may locally generate some or all of the autosuggest data using the first set of search results 210. For example, the user device 102 may, for at least one of the first set of search results 210, access the state specified by the AAM included in the result 210, determine one or more terms (e.g., text) included in the state, and generate the autosuggest data based on (e.g., to include) the terms. In further examples, the user device 102 may generate the autosuggest data based on one or more previous search queries 220 and/or other user inputs received by the device 102. In the examples described above, the user device 102 may receive the search query 220 from the user (e.g., by auto-completing at least part of the query 220) using the autosuggest data.

In block 308, the user device 102 identifies one or more of the first set of search results 210 (e.g., which the device 102 has previously indexed and stored locally on the device 102) using the search query 220. For example, the user device 102 may identify the one or more of the first set of search results 210 based on matches between terms of the search query 220 and terms included in the identified results 210. In some examples, the user device 102 transmits the autosuggest request to the search system 100, as described above, in parallel with (e.g., during) identifying the one or more of the first set of search results 210 using the search query 220. In block 310, the user device 102 transmits the search query 220 to the search system 100. For example, the user may have caused the user device 102 to submit the search query 220 to the search system 100 by selecting a search button 224 of the GUI of the search app 240.

In block 312, the user device 102 receives a second set of one or more search results 226 from the search system 100 in response to transmitting the search query 220 to the system 100. In some examples, at least one of the second set of search results 226 includes an AAM that references a native app (e.g., one of the native apps 202 indicated by the request 200, or another native app), and indicates one or more operations for the app to perform. In other words, the AAM specifies a state of the native app, and the app performing the operations sets the app into the state. In other examples, at least one of the second set of search results 226 includes an ADA indicating a location where the user device 102 may download a native app, a URL used by a web browser app 244 to access a web resource, and/or other content (e.g., native apps, audio, video, and/or documents). In any case, in block 314, the user device 102 displays the identified one or more of the first set of search results 210 and the second set of search results 226 to the user (e.g., as one or more user selectable links).

In additional examples, the search query 220 may be a portion (e.g., one or more characters) of a full search query (e.g., a text string) intended by the user. In these examples, upon receiving the partial search query 220, the user device 102 may display one or more (e.g., highest ranking) of the first and second sets of search results 210, 226 in the manner described above. For example, the user device 102 may display those of the first and second sets of search results 210, 226 that are most relevant to the partial search query 220 (e.g., in an order of relevance to the query 220). Also in these examples, upon receiving the full search query, the user device 102 may update the first and second sets of search results 210, 226 and display any of the same and/or one or more other ones of the results 210, 226. For example, the user device 102 may display one or more of the updated first and second sets of search results 210, 226 that are most relevant to the full search query (e.g., in an order of relevance to the full search query).

Figure 4A:
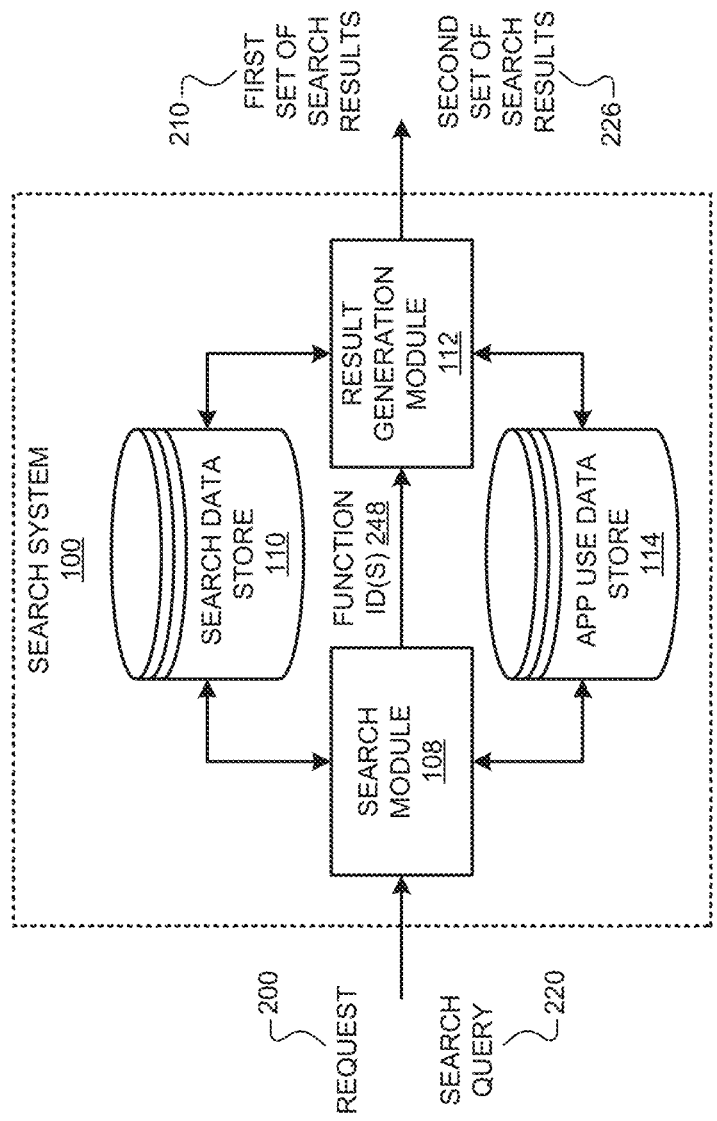
FIG. 4A is a functional block diagram of an example search system.

FIG. 4A is a functional block diagram of an example search system 100 of the present disclosure. As shown in FIG. 4A, the search system 100 includes a search module 108, a data store 110, a result generation module 112, and a data store 114. In this example, the search module 108 receives one of a request 200 and a search query 220 from the user device 102 and identifies one or more function records included in the data store 110 based on the request 200 or query 220. As one example, the search module 108 may receive the request 200 from the user device 102 and optionally store data (e.g., an indication of one or more native apps 202 that are installed on the device 102, whether and how often a user of the device 102 has recently used any of the apps 202 on the device 102, and/or a geographic location of the device 102) included in the request 200 in the data store 114. The search module 108 may then identify one or more function records included in the data store 110 based on the request 200. As another example, the search module 108 may receive the search query 220 from the user device 102 and identify one or more function records included in the data store 110 based on the query 220. In any case, the search module 108 transmits one or more function IDs 248 associated with the identified function records to the result generation module 112. The result generation module 112 generates a corresponding one of a first set of search results 210 and a second set of search results 226 based on the function ID(s) 248. The first and second sets of search results 210, 226 may specify one or more states of (e.g., native or web-based) apps and/or include other content, as described herein. The result generation module 112 then transmits the first and second sets of search results 210, 226 to the user device 102.

Figure 4B:
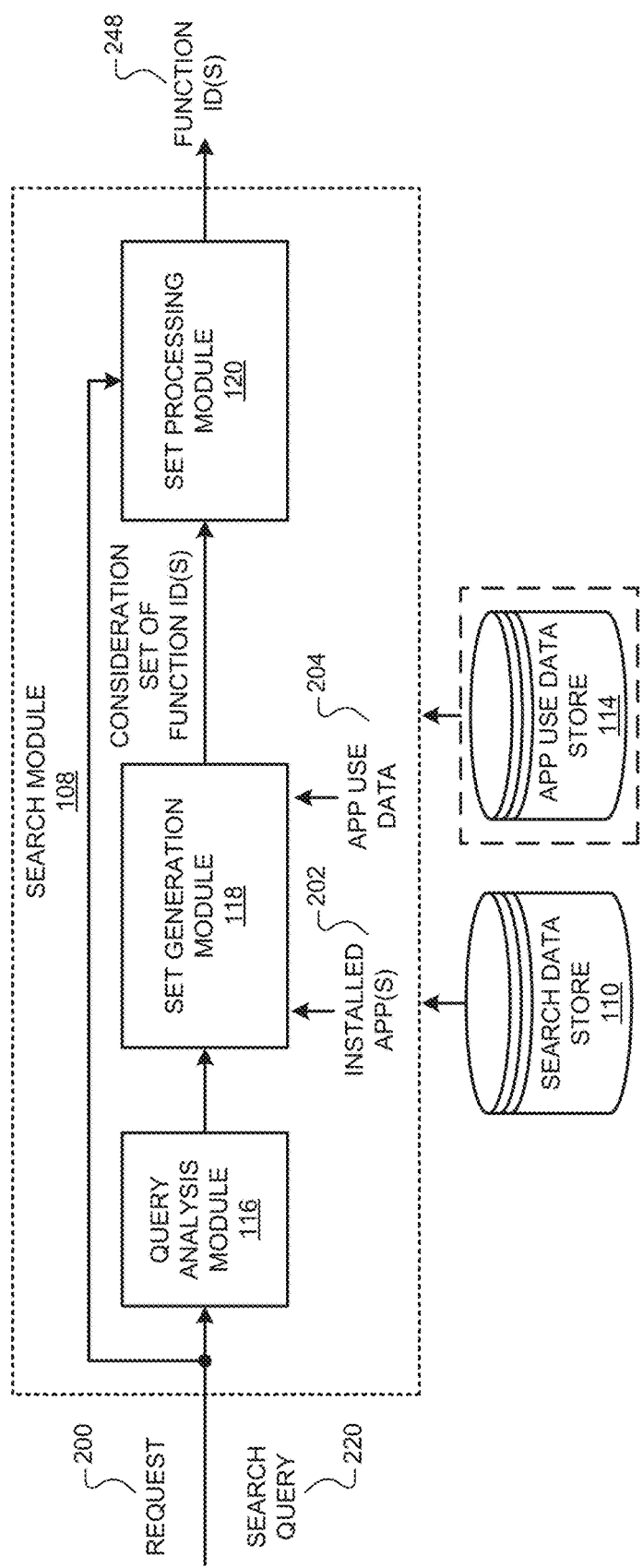
FIG. 4B is a functional block diagram of an example search module.

FIG. 4B is a functional block diagram of an example search module 108 that may be included in the search system 100 according to the present disclosure. FIG. 4B further shows example data stores 110, 114 that may be included in the search system 100 of this disclosure. The search module 108 of FIG. 4B includes a query analysis module 116, a consideration set generation module 118 (hereinafter, the "set generation module 118"), and a consideration set processing module 120 (hereinafter, the "set processing module 120"). In this example, the query analysis module 116 receives one of a request 200 and a search query 220 from a user device 102. As described herein, the request 200 indicates one or more native apps 202 that are installed on the user device 102. As also described herein, in some examples, the request 200 further includes app use data 204 indicating (e.g., a frequency of) recent use of the native apps 202 and/or a geographic location of the user device 102. As further described herein, the search query 220 may include text, numbers, and/or symbols (e.g., punctuation). The query analysis module 116 analyzes the search query 220. For example, to analyze the search query 220, the query analysis module 116 may perform one or more of tokenization, filtering, stemming, synonymization, and stop word removal with respect to the query 220. In some examples, the query analysis module 116, or another module (not shown) performs an analysis of the request 200 (e.g., to extract the indication of the native apps 202 and/or the information relating to their recent use). In any case, the set generation module 118 identifies one or more function records included in the data store 110 based on the received (e.g., analyzed) request 200 or search query 220. The identified function records may be referred to herein as a "consideration set." As one example, the set generation module 118 may identify the function records by determining that an AAM included in each record references one of the native apps 202 indicated by the request 200 (and, e.g., is associated with the geographic location indicated by the request 200). For example, the set generation module 118 may make this determination using the indication of the native apps 202 and/or the app use data 204 included in the request 200 and/or stored in the data store 114. As another example, the set generation module 118 may identify the function records based on one or more matches between one or more terms of the search query 220 and one or more terms included in (e.g., ASI of) the records. In any case, the set processing module 120 processes (e.g., scores) the function records of the consideration set and selects one or more function IDs 248 that identify the processed records (e.g., based on the scores). The set processing module 120 then transmits the function ID(s) 248 to the result generation module 112, as described above with reference to FIG. 4A.

As described herein, the set generation module 118 identifies the consideration set of function records included in the data store 110 based on the request 200 or the search query 220. In some examples, the set generation module 118 identifies the function records of the consideration set based on matches between terms of the search query 220 and terms included in the records. For example, the set generation module 118 may identify the function records based on one or more matches between one or more tokens generated by the module 118 using the search query 220 and one or more words included in the ASI and/or function IDs of the records. In other examples, the set generation module 118 may identify the function records of the consideration set by determining that the records (e.g., the one or more AAMs included therein) describe states of the native apps 202 indicated by the request 200 (and, e.g., are associated with the geographic location of the user device 102 also indicated by the request 200).

As also described herein, the set processing module 120 processes the consideration set to generate the function ID(s) 248. In some examples, to process the consideration set, the set processing module 120 generates scores for the functions records of the set. The scores associated with the function records may be referred to herein as "result scores." Accordingly, in some examples, each function record of the consideration set has a corresponding result score. The set processing module 120 may then select one or more function records from the consideration set based on the result scores associated with the records. For example, the set processing module 120 may select one or more function records of the consideration set that have the highest one or more result scores. The set processing module 120 then selects one or more AAMs, ADAs, WAMs, and/or other content from the selected function records (e.g., the highest-scoring records) and transmits the selected data to the user device 102 as part of the corresponding one of the first and second sets of search results 210, 226. The set processing module 120 may also transmit the result scores associated with the selected data (i.e., with the corresponding function records) to the user device 102, e.g., as part of the first or second set of search results 210, 226. For example, a selected data may be associated with a result score of a function record from which the data was selected. As described herein, in some examples, upon receiving the result scores associated with the first set of search results 210, the user device 102 may further (e.g., locally) modify one or more of the scores based on the search query 220. For example, the user device 102 may modify each result score based how relevant the associated function record is to the search query 220 (e.g., using a machine-learned or analogous model).

The information conveyed by the first and second sets of search results 210, 226 may depend on how the result scores are calculated by the set processing module 118. For example, the result scores may indicate the relevance of an app function or state to the request 200 or the search query 220, the popularity of the app function or state, or other properties of the app function or state, depending on the parameters the set processing module 120 uses to score the function records of the consideration set. The set processing module 120 may generate result scores for function records in a variety of different ways. In some examples, the set processing module 120 generates a result score for a function record based on one or more scoring features. The scoring features may be associated with the function record and/or the search query 220. A function record scoring feature (hereinafter, "record scoring feature") may be based on any data associated with a function record. For example, record scoring features may be based on any data included in ASI of a function record. Example record scoring features include a quality score and whether a function record includes an AAM that leads to a default state, or a deeper app state. A query scoring feature may include any data associated with the search query 220. Example query scoring features include a number of words in the search query 220, popularity of the query 220, and expected frequency of words in the query 220. A record-query scoring feature may include any data that may be generated based on data associated with both a function record and the search query 220 that resulted in identification of the record by the set generation module 118. Example record-query scoring features include parameters that indicate how well terms of the search query 220 match terms of ASI of the identified function record. In some examples, a request scoring feature includes any data associated with the request 200 (e.g., the native apps 202, their recency and/or frequency of use, and/or the geographic location of the user device 102 indicated therein). In still other examples, a record-request scoring feature may include any data that may be generated based on data associated with both a function record and the request 200 that resulted in identification of the record by the set generation module 118, in a similar manner as described above. In general, the set processing module 120 may generate a result score for a function record based on at least one of the record, query, request, record-query, and record-request scoring features described above.

In a specific example, the result scores associated with the function records identified to generate the first set of search results 210 may be generated based on whether (and, e.g., how often) the user has accessed the states specified by the records, how many other users (and, e.g., how often the other users) have accessed the states, and/or how new (e.g., recent) information included in the states is. For example, in a given day, a certain number of users may select a "Yelp— Coffee Shops near me" search result, which may lead to a particular result score being associated with the corresponding function record. In the same day, a smaller number of users may select a Starbucks search result, or select a Starbucks "category" in Yelp, which may lead to a lower result score being associated with the corresponding function record. Additionally, a more recent state (e.g., a news article) of a native news app may result in a higher result score being associated with the corresponding function record.

In examples where the above-described user or recency information associated with function records is sparse or missing, a default function record result score generation technique can be used for each native app. For example, a result score for a function record describing an entry in Urbanspoon may correspond to a score (e.g., a percentage from 0 to 100) provided by Urbanspoon for the entry. For instance, a popular restaurant in Urbanspoon may have a score of 95, and a poorly reviewed restaurant in Urbanspoon may have a score of 55. For native apps including information that is relevant to particular geographic locations, the top "n" highest-scoring (e.g., based on the geographic location of the user device 102) function records may be selected. For native apps (e.g., TechCrunch) that include information associated with popularity and recency (e.g., date) attributes, the most popular and/or recent function records may be selected (e.g., the selected records may correspond to 50 most recent articles that are popular and/or new). In any case, in this example, to generate the first set of search results 210, the set processing module 120 may select one or more highest-ranking function records from the consideration set identified based on the request 200.

The set processing module 120 may determine a result score for a function record based on one or more of the scoring features listed herein and/or additional scoring features not explicitly listed. In some examples, the set processing module 120 includes one or more machine-learned models (e.g., a supervised learning model) configured to receive one or more scoring features. The machine-learned models may generate result scores for function records based on at least one of the scoring features described above. For example, the set processing module 120 may pair the search query 220 with each function record and calculate a vector of features for each (query, record) pair. The vector of features may include one or more record, query, and record-query scoring features. Similarly, the set processing module 120 may pair the request 200 with each function record and calculate a vector of features for each (request, record) pair, including one or more record, request, and record-request scoring features. The set processing module 120 may then input the vector of features into a machine-learned regression model to calculate a result score for the function record. In some examples, the machine-learned regression model includes a set of decision trees (e.g., gradient-boosted decision trees), or a logistic probability formula. In other examples, the machine-learned task described above can be framed as a semi-supervised learning task, where a minority of training data is labeled with human-curated scores and the rest of the training data is used without human-curated labels.

The result scores associated with the function records (e.g., the AAMs included therein) may be used in a variety of different ways. In some examples, the result scores is used to rank the AAMs within a list. In these examples, a higher (e.g., larger) result score may indicate that the corresponding AAM (e.g., the associated state or function of a native app) is more relevant to the request 200 or the search query 220 than another AAM having a lower (e.g., smaller) result score. In examples where one or more of the first and second sets of search results 210, 226 are displayed on the user device 102 as a list of user selectable links, the links for AAMs associated with larger result scores may be listed closer to the top of the list (e.g., near the top of the screen). In these examples, user selectable links for AAMs having lower result scores may be located farther down the list (e.g., off screen) and may be accessed by scrolling down a screen of the user device 102. In some examples, as shown in FIG. 2, the user device 102 groups together user selectable links that are associated with the same native app.

Figure 5B:
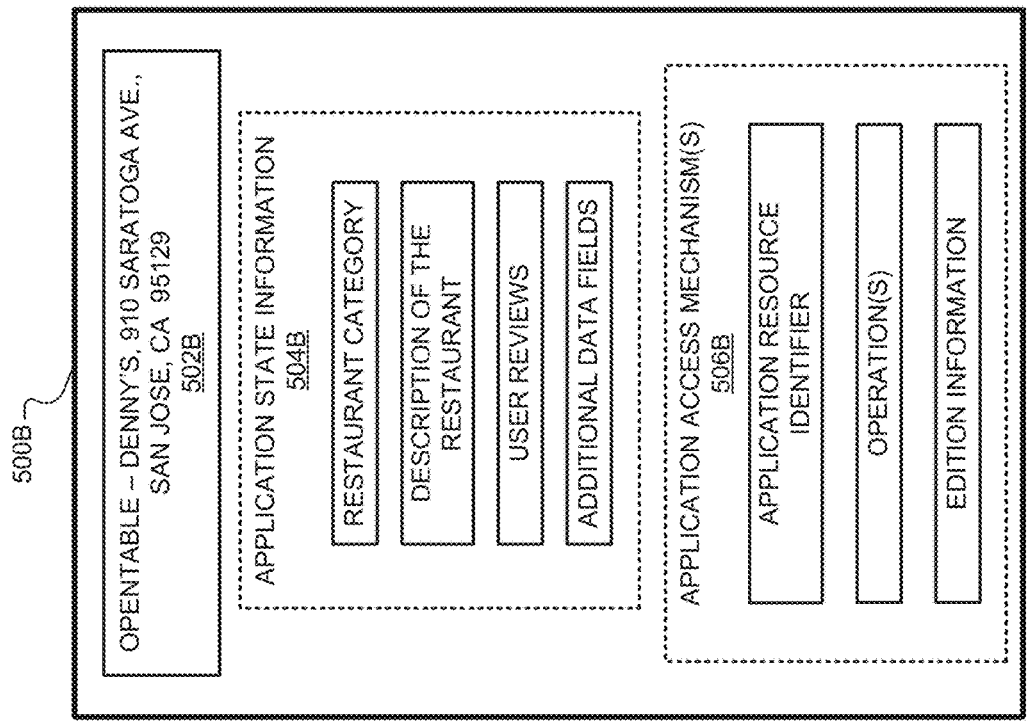
FIGS. 5A-5B are functional block diagrams of example function records.
Figure 5A:
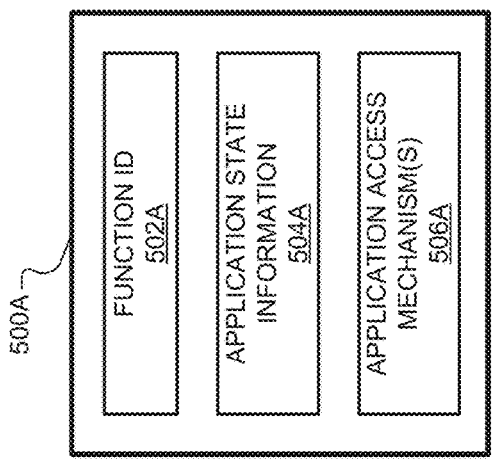

FIGS. 5A-5B illustrate example function records 500A and 500B, respectively that may be included in the data store 110 of the present disclosure. The function record 500A of FIG. 5A includes a function ID 502A, ASI 504A, and one or more AAMs 506A. The function record 500A may include data related to a function of a native app and/or a state (e.g., an app state) of the app resulting from performance of the function. The data store 110 may include one or more function records each having a similar structure as that of the function record 500A (e.g., each having a function ID, ASI, and one or more AAMs).

The function ID 502A may be used to identify the function record 500A among other function records included in the data store 110. The function ID 502A may be a string of alphabetic, numeric, and/or symbolic characters (e.g., punctuation marks) that uniquely identify the function record 500A. In some examples, the function ID 502A describes a function and/or a state of a native app in human-readable form. For example, the function ID 502A may include a name of a native app referenced by the AAM(s) 506A. Additionally, or alternatively, the function ID 502A may be a human-readable string that describes a function performed according to the AAM(s) 506A and/or a state of a native app resulting from performance of the function. In some examples, the function ID 502A includes a string in the format of a URL of a WAM also included in the function record 500A, which may uniquely identify the record 500A. In a specific example, if the function record 500A describes a function of Yelp, the function ID 502A may include the string "Yelp" with a description of a state described by the ASI 504A. For example, if the function record 500A describes an entry in Yelp for the restaurant "The French Laundry®" (hereinafter, "The French Laundry"), the function ID 502A may be "Yelp—The French Laundry." In an example where the function ID 502A includes a string in the format of a URL, the ID 502A may be the string "www.yelp.com/biz/the-french-laundry-yountville-2?ob=1" to uniquely identify the function record 500A in the data store 110.

The ASI 504A may include data describing a state into which a native app is set according to the AAM(s) 506A. Additionally, or alternatively, the ASI 504A may include data describing a function performed according to the AAM(s) 506A. The ASI 504A may include a variety of different types of data, e.g., structured, semi-structured, and/or unstructured data. The ASI 504A may be extracted or inferred from documents retrieved from the data source(s) 104. The ASI 504A may also include manually-generated data and/or be updated so that up-to-date search results 210, 226 are provided in response to requests 200 and search queries 220.

In some examples, the ASI 504A includes data that is presented to a user when a native app referenced by the AAM(s) 506A is in a state specified by the AAM(s) 506A. For example, the ASI 504A may include data that describes a state of the native app after the user device 102 has performed one or more operations indicated by the AAM(s) 506A. In one example, if the function record 500A is associated with a shopping app, the ASI 504A may include data that describes products (e.g., names and prices) that are shown when the app is set into a state defined by the AAM(s) 506A. In another example, if the function record 500A is associated with a music player app, the ASI 504A may include data that describes a song (e.g., name and artist) that is played when the app is set into a state defined by the AAM(s) 506A.

The type(s) of data included in the ASI 504A may depend on the type(s) of information associated with a state and/or functionality defined by the AAM(s) 506A. In one example, if the function record 500A is for a native app that provides reviews of restaurants, the ASI 504A may include information (e.g., text and numbers) related to a restaurant, such as a category of the restaurant, reviews of the restaurant, and a menu for the restaurant. In this example, the AAM(s) 506A may cause the native app to launch and retrieve information for the restaurant. In another example, if the function record 500A is for a native app that plays music, the ASI 504A may include information related to a song, such as a song name, an artist name, lyrics, and listener reviews. In this example, the AAM(s) 506A may cause the native app to launch and play the song described in the ASI 504A.

The AAM(s) 506A may include an application resource identified (ARI) and/or one or more operations for the user device 102 to perform. For example, the ARI may be a string having an app-specific scheme. The ARI may reference a native app and indicate one or more operations for the user device 102 (e.g., the app) to perform (e.g., reference the app, a domain name, and a path to be used by the app to retrieve and display information to the user).

An example ARI for the native app "OPENTABLE®" by OpenTable, Inc. (hereinafter, "OpenTable") on the ANDROID® OS is "vnd.opentable.deeplink://opentable.com/restaurant/profile?rid=88333&refid=1." A portion of the ARI references OpenTable. For example, the substring "vnd.opentable.deeplink" of the ARI references OpenTable. The ARI also indicates one or more operations for OpenTable to perform. For example, OpenTable may retrieve and display information included in the ARI domain and path defined by the substring "opentable.com/restaurant/profile?rid=88333&refid=1." In response to receiving the ARI, the user device 102 may launch OpenTable and display information retrieved from a location indicated by the ARI. For example, the ARI may be provided by a developer of OpenTable. In some examples, the ARI is an app-specific resource identifier that is defined by a developer of the native app referenced by the ARI. In these examples, the search app 240 may receive the ARI and the OS 238 may send the ARI to the native app referenced by the ARI. The native app may then launch and be set or configured into a state specified by the ARI.

In some examples, a state or function of a native app is not accessible using an ARI. As one example, the state or function may not include a corresponding ARI that the native app may use to access the state or perform the function. As another example, the native app may not be configured to receive ARIs. In these examples, an AAM (e.g., one of the AAM(s) 506A) that references the native app may include one or more operations that cause the app to access the state or perform the function that may not otherwise be accessible using an ARI. For example, the search app 240 may receive the operations and execute the operations to set the native app into the desired state (e.g., causing the app to perform the desired function). In a specific example, the operations may cause the native app to launch and perform one or more additional steps after launching. For example, using one or more operations included in the AAM, the search app 240 may trigger the native app to cause the app to launch, and then wait for a period of time for the app to launch. Then, the search app 240 may perform one or more additional operations included in the AAM, such as issuing a search instruction to the native app. In other examples, the native app may be configured to directly (i.e., without the aid of the search app 240) receive and perform the operations included in the AAM. In these examples, the native app may launch according to one or more operations included in the AAM. The launched app may then perform one or more additional operations included in the AAM.

In some examples, the AAM(s) 506A includes one or more operations for the user device 102 to perform in addition to the operations indicated by the ARI. The search app 240 executing on the user device 102, the OS 238 of the device 102, and/or the native app referenced by the AAM(s) 506A (e.g., one of the native app(s) 246 installed on the device 102) may perform the additional operations to set the app into a state specified by the AAM(s) 506A. In some examples, the operations are included in a script. Examples of the operations include launching a native app, waiting for the app to start, creating and sending a search request to a server associated with a native app, setting a current geo-location in a native app, making a restaurant reservation, sending a text message, and adding an appointment to a calendar.

In some examples, the AAM(s) 506A does not include an ARI. Instead, the AAM(s) 506A may include one or more operations that reference a native app. The operations may be performed by the user device 102. The operations may include one or more instructions for at least one of the search app 240, the OS 238, and the native app referenced by the AAM(s) 506A. In response to selection of the AAM(s) 506A, the user device 102 may perform the operations. In some examples, the operations are included in a script.

The AAM(s) 506A may further include edition information that indicates one or more native app editions with which the AAM(s) 506A are compatible. For example, the edition information may indicate an OS and/or a device type with which each of one or more of the AAM(s) 506A is compatible. In some examples, using the edition information, the search system 100 determines which, if any, of the AAM(s) 506A are compatible with (e.g., the OS 238, and/or a device type of) the user device 102 and should therefore be transmitted to the device 102 as part of search results 210, 226, as described herein. For example, the search system 100 may transmit those of the AAM(s) 506A to the user device 102 that the system 100 determines are compatible with the device 102 using the edition information. The user device 102 may generate user selectable links for the transmitted AAM(s) 506A. In other examples, the search system 100 may transmit the AAM(s) 506A and the edition information to the user device 102. In these examples, using the edition information, the user device 102 may identify those of the AAM(s) 506A that are compatible with the user device 102 and generate user selectable links for the identified AAM(s) 506A, as also described herein.

In examples where the function record 500A also includes a WAM, the search system 100 may transmit the WAM to the user device 102 along with, or in place of, the AAM(s) 506A, as described herein. For example, the WAM may specify a state of a web-based app that is equivalent (e.g., analogous) to the state specified by the AAM(s) 506A. In other examples, the function record 500A may also include one or more ADAs that each specify a location (e.g., a digital distribution platform) where a native app referenced by each of one or more of the AAM(s) 506A may be downloaded. In these examples, the search system 100 may transmit the ADAs to the user device 102 along with the AAM(s) 506A, WAM, and/or edition information. In some examples, upon determining that a particular one of the AAM(s) 506A received by the user device 102 references a native app that is not installed on the device 102, the device 102 generates a download and install user selectable link that includes one of the ADAs that is associated with the app (e.g., with the particular one of the AAM(s) 506A) and display the link to a user of the device 102. In response to the user selecting the link, the user device 102 may download and install the native app using the ADA, launch the app, and set the app into a state specified by the particular one of the AAM(s) 506.

As described herein, a single native app may provide a variety of different functionalities. For example, a restaurant reservation app can access reviews for a variety of different restaurants and set up reservations at a variety of different restaurants. Similarly, a travel app can book hotels, book flights, and provide reviews for different travel destinations. The different functionalities associated with a single native app may be accessed using a plurality of different AAMs. For example, with respect to the restaurant reservation app, the data store 110 may include multiple function records each having different AAMs for accessing restaurant reviews and setting up reservations within the app. Similarly, with respect to the travel app, the data store 110 may include multiple function records each having different AAMs for booking hotels or flights and accessing reviews for different travel destinations within the app.

AAMs for a single native app may vary in complexity. In some examples, the AAMs cause the native app to launch (e.g., instruct the OS 238 to launch the app) and then perform one or more additional operations after launching, as described above. In other examples, the AAMs may cause the native app to launch into a default state (e.g., a homepage) without performing any additional operations. A function record including an AAM that causes a native app to launch into a default state may be thought of as a record that is associated with the app, but not with any particular state of the app. A function record including such an AAM may include ASI describing the native app, instead of any particular state of the app. For example, the ASI may include a name of a developer of the native app, a publisher of the app, a category (e.g., genre) of the app, a description of the app (e.g., a developer's description), and a price of the app. The ASI may also include security or privacy data about the app, battery usage of the app, and bandwidth usage of the app. The ASI may also include app statistics for the native app, e.g., numerical data related to the app, such as a number of downloads, a download rate (e.g., downloads per month), a number of ratings, and a number of reviews associated with the app.

FIG. 5B illustrates the function record 500B, which is associated with a state of OpenTable. OpenTable is a restaurant reservation app that allows users to search for restaurants and make restaurant reservations. OpenTable provides information about restaurants, including descriptions of the restaurants and user reviews for the restaurants. The example function record 500B of FIG. 5B describes a state of OpenTable in which OpenTable accesses information for a specific Denny's@restaurant located in San Jose, Calif.

The function record 500B includes a function ID "OpenTable—Denny's, 910 Saratoga Ave., San Jose, Calif. 95129" indicated at 502B, which may be used as a unique identifier of the record 500B. In other examples, the function ID 502B may include a URL as a unique identifier for the function record 500B. For example, the function ID 502B may include the string "http://www.opentable.com/dennys-san-jose-11" as the unique identifier. In some examples, such a function ID also corresponds to a WAM of a function record that includes the function ID. In other examples, the function ID 502B may be a string of characters, numbers, and/or symbols that are not presented in human-readable form.

The function record 500B also includes ASI 504B. The ASI 504B includes data fields for a restaurant category of the specific Denny's® restaurant, a description of the Denny® restaurant, user reviews of the Denny's® Restaurant, and additional data fields. The restaurant category field may include the text "breakfast" and "late night diners," for example. The description field may include text that describes the Denny's® restaurant. The user reviews field may include text of user reviews for the Denny's® restaurant. The additional data fields may include additional data for the Denny's® restaurant that may not fit within the other defined fields, such as a menu, prices, and operating hours for the restaurant.

The function record 500B also includes one or more AAMs 506B. The AAM(s) 506B may reference OpenTable and include one or more operations to be performed by the user device 102 (e.g., by OpenTable). For example, as shown in FIG. 5B, the AAM(s) 506B may include an ARI and/or one or more operations that cause the user device 102 to access the entry for the specific Denny's® restaurant in OpenTable. An example of the ARI is the string "vnd.o-pentable.deeplink://opentable.com/restaurant/profile?rid=1180&refid=11."

Figure 6B:
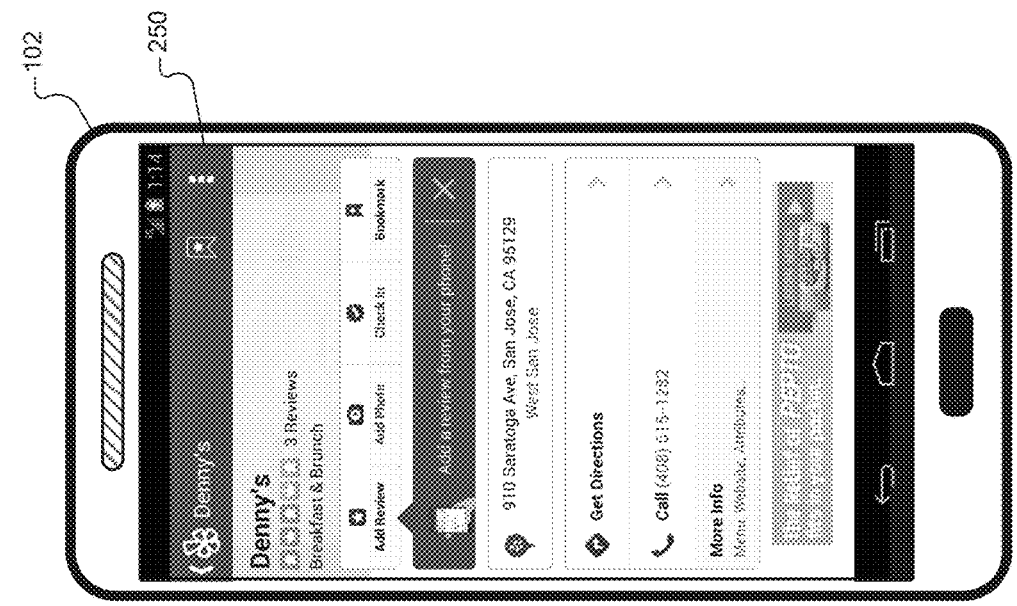
Figure 6A:
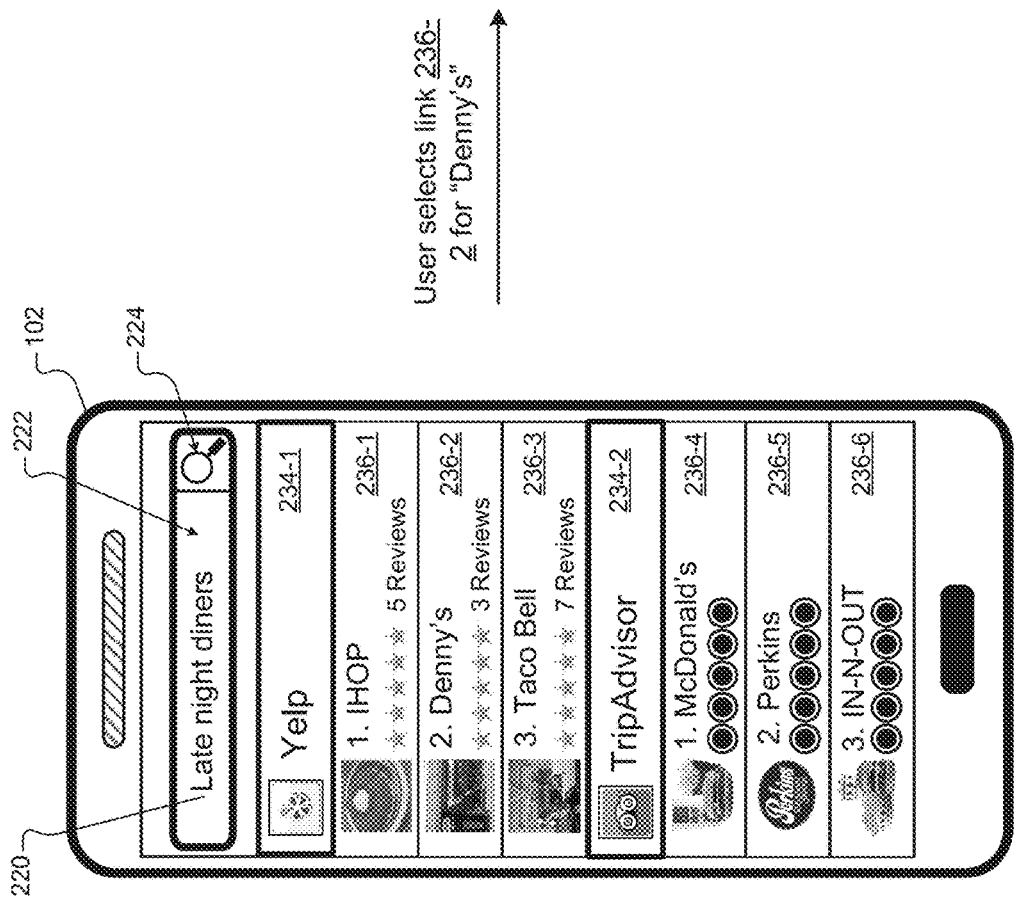

FIGS. 6A-6B illustrate example GUIs that may be generated on a user device 102 according to the present disclosure. Specifically, FIG. 6A illustrates an example GUI of a search app 240 executing on the user device 102. FIG. 6B, in turn, illustrates an example GUI of one of the native app(s) 246 included on the user device 102 (i.e., Yelp). The user device 102 displays the example GUI of FIG. 6B as a result of a user of the device 102 interacting with (e.g., selecting a user selectable link 236-2 included in) the example GUI of FIG. 6A.

As shown in FIG. 6A, the user has entered a search query ("Late night diners") 220 into the GUI of the search app 240. Specifically, the user has entered the search query 220 into a search field (e.g., a so-called "search box." or "search bar") 222 of the GUI. In this example, the user may have then selected (e.g., touched, or clicked) a search button 224 of the GUI to cause the search app 240 (i.e., the user device 102) transmit a query wrapper that includes the search query 220 to the search system 100. In other examples, the user may have caused the search app 240 to transmit the query wrapper to the search system 100 using other techniques (e.g., by touching or clicking another button or GUI element, or via voice command techniques).

Although not shown in FIG. 6A, prior to the user entering the search query 220 into the GUI of the search app 240, the user device 102 has transmitted a request 200 indicating one or more of the native app(s) 246 included (e.g., installed) on the user device 102 (e.g., one or more native apps 202) to the search system 100. In some examples, the native apps 202 indicated by the request 200 are one or more native apps that have been recently (e.g., frequently) used by the user on the user device 102 (e.g., Yelp). As described herein, in some examples, the request 200 further indicates a geographic location of the user device 102. For example, the user device 102 may have transmitted the request 200 to the search system 100 upon the device 102 being turned on by the user, periodically at regular intervals, or in response to an input received from the user. In this example, the search system 100 has received the request 200 from the user device 102 and has identified one or more function records included in the data store 110 based on the request 200. Specifically, as described herein, the search system 100 has identified the function records by determining that an AAM included in each record references one of the native apps 202 indicated by the request 200 (and, e.g., by further determining that the AAM is associated with the geographic location). The search system 100 has further processed (e.g., scored) the identified function records and selected one or more AAMs from the processed records. The search system 100 has then transmitted the selected AAMs to the user device 102 as part of a first set of search results 210, e.g., along with link data for generating user selectable links for the AAMs and/or results scores for arranging the links. The user device 102 has received the first set of search results 210 from the search system 100, indexed (e.g., rendered searchable) the results 210, and locally stored the indexed results 210.

In this example, after receiving the query wrapper including the search query 220 from the user device 102, the search system 100 has identified one or more function records included in the data store 110 based on the query 220. For example, the search system 100 may have identified the function records based on matches between terms of the search query 220 and terms (e.g., of ASI) included in the records. The search system 100 has further processed (e.g., scored) the identified function records and selected one or more AAMs, ADAs, WAMs (e.g., URLs), and/or other content (e.g., audio data, video data, and/or documents) from the processed records. The search system 100 has then transmitted the selected data to the user device 102 as part of a second set of search results 226, e.g., along with link data for generating user selectable links for the data and/or results scores for arranging the links.

In the example of FIG. 6A, upon receiving the request 200 and the search query 220, the search system 100 has identified (albeit at different points in time) function records included in the data store 110 that describe states in Yelp and the native app "TRIPADVISOR®" by TripAdvisor, LLC (hereinafter, "TripAdvisor"). In particular, the search system 100 has identified function records that correspond to entries in Yelp for "IHOP," "Denny's," and "Taco Bell." The search system 100 has also identified function records that correspond to entries in TripAdvisor for "McDonald's," "Perkins," and "In-N-Out." In the example of FIGS. 6A-6B, Yelp and TripAdvisor are installed on the user device 102. Moreover, each of Yelp and/or TripAdvisor may correspond to a native app that has been recently (e.g., frequently) used by the user on the user device 102. In a specific example where Yelp has been recently (e.g., frequently) used by the user on the user device 102 and is thus indicated by the request 200, the search system 100 may have identified the function records that correspond to the entries in Yelp for "IHOP," "Denny's," and "Taco Bell" based on the request 200. In the same example, the search system 100 may have identified the function records that correspond to the entries in TripAdvisor for "McDonald's," "Perkins," and "In-N-Out" based on the search query 220 (e.g., assuming TripAdvisor is not indicated by the request 200).

In some examples, the search system 100 has identified one or more additional function records that each represent a state in Yelp, TripAdvisor, or another native app, or other content (e.g., audio data, video data, and/or documents). For example, the search system 100 may have identified the additional function records based on the request 200 (e.g., indicating the geographic location of the user device 102) or the search query 220, in the manner described above. In these examples, the search system 100 may have selected one or more AAMs, ADAs, WAMs (e.g., URLs), and/or other content from the additional function records and transmitted the selected data to the user device 102. While the GUI of FIG. 6A does not include user selectable links for this additional data, the search app 240 may nevertheless display these links to the user, e.g., below the links 234-1 ... 236-6 shown in FIG. 6A. For example, the user may view these additional user selectable links by scrolling or paging downward within the GUI.

As explained herein, the first and second sets of search results 210, 226 transmitted by the search system 100 to the user device 102 in response to the request 200 and the search query 220 include AAMs for the app functions/states indicated in the links 236-1 ... 236-6 (collectively, the "links 236"). The first and second sets of search results 210, 226 also include link data (e.g., text and/or images) associated with each AAM. For example, the link 236-1 for "IHOP" includes the text "IHOP" and an image of pancakes, which may be included in link data associated with the AAM included in the link 236-1. The user may select (e.g., touch, or click on) any of the links 236 to access the app functions/states indicated by the corresponding one(s) of the links 236. For example, the user may select an area of the GUI of FIG. 6A including the link 236-1 for "IHOP" to access the corresponding entry in Yelp for "IHOP." In FIG. 6A, the links 236 are grouped together according to the native apps associated with the links 236. For example, the links 236-1 ... 236-3 for Yelp and the links 236-4 ... 236-6 for TripAdvisor are grouped together under Yelp and TripAdvisor headers 234-1 and 234-2, respectively. In other examples (not shown), links for different native apps may be mixed rather than grouped.

In the example of FIG. 6A, the user has selected the link 236-2 for "Denny's." In response to the user selecting the link 236-2, the user device 102 has launched Yelp and performed one or more operations indicated by the AAM included in the link 236-2. As a result of performing the operations, the user device 102 has set Yelp into the state specified by the AAM, as shown in FIG. 6B. In this example, the AAM may reference Yelp and indicate a path for Yelp to find information for the particular "DENNY'S®" restaurant described by the link 236-2 (i.e., by the AAM). For example, the AAM may include an ARI that references Yelp and indicates one or more operations for Yelp to perform, such as retrieving data from a path included in the ARI. As such, the ARI may cause Yelp to perform the function of retrieving and displaying the information for the particular "DENNY'S®" restaurant. An example of the ARI is the string "yelp:///biz/dennys-westsanjose." FIG. 6B shows an example GUI 250 of Yelp displayed on the user device 102 after the user has selected the link 236-2. As shown in FIG. 6B, in response to the user selecting the link 236-2, Yelp is set into a state in which Yelp displays retrieved information about the "DENNY'S®" restaurant described by link 236-2.

FIGS. 7A-7B illustrate other example GUIs that may be generated on the user device 102 according to the present disclosure. The GUIs of FIGS. 7A-7B include some of the same or similar elements (e.g., user selectable links, headers, and other GUI elements, such as search fields, search buttons, and other buttons or links) as those of the GUI of the search app 240 described above with reference to FIG. 6A. In particular, the GUI of FIG. 7A includes a subset of the elements of the GUI of FIG. 6A, which corresponds to the first set of search results 210. The GUI of FIG. 7B also includes the subset of the elements, as well as the remaining elements of the GUI of FIG. 6A, which correspond to the second set of search results 226. In the example of FIGS. 7A-7B, Yelp has been recently (e.g., frequently) used by the user on the user device 102 and is thus indicated by the request 200, whereas TripAdvisor has not been recently (e.g., frequently) used by the user on the user device 102 and is therefore not indicated by the request 200. In this example, the user device 102 receives the first set of search results 210 from the search system in response to transmitting the request 200 to the system 100, as described above. As shown in FIG. 7A, the user device 102 displays the first set of search results 210 (i.e., as links 234-1, 236-1, 236-2, and 236-3) to the user in response to the user entering the search query 220 into the GUI of the search app 240. In this example, the user device 102 receives the second set of search results 226 from the search system 100 in response to transmitting the search query 220 to the system 100, as also described above. As shown in FIG. 7B, the user device 102 displays the second set of search results 226 (i.e., as links 234-2, 236-4, 236-5, and 236-6) to the user alongside the first set of search results 210 upon receiving the results 226. For example, the user device 102 may display the first set of search results 210 to the user immediately upon the user entering the search query 220 into the GUI of the search app 240. At a later point in time (e.g., immediately upon receiving the second set of search results 226 from the search system 100), the user device 102 may display the results 226 to the user. As shown in FIGS. 7A-7B, the user device 102 may display the first and second sets of search results 210, 226 separately (e.g., within distinct regions of the GUI of the search app 240, with the results 210 displayed above the results 226, and/or using GUI elements that separate the results 210, 226), thereby indicating to the user that the first and second sets of search results 210, 226 are different.

Figure 8B:
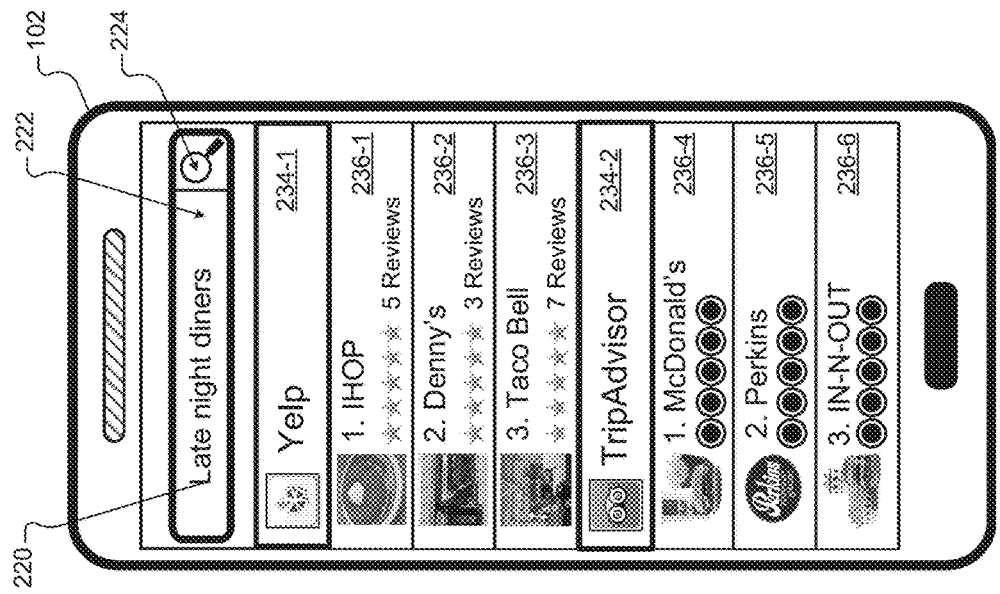
Figure 8A:
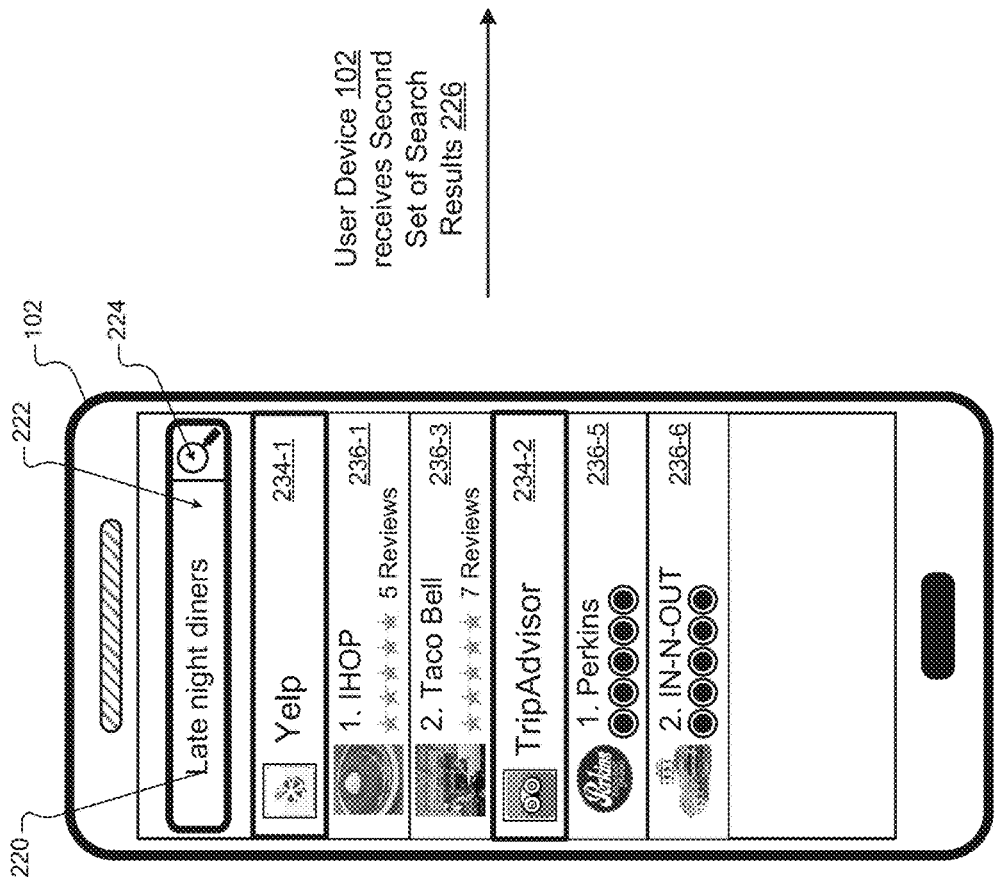

FIGS. 8A-8B illustrate still other example GUIs that may be generated on the user device 102 according to the present disclosure. The GUIs of FIGS. 8A-8B include some of the same or similar elements as those of the GUI of the search app 240 described above with reference to FIG. 6A. In a similar manner as described above, the GUI of FIG. 8A includes a subset of the elements of the GUI of FIG. 6A, which corresponds to the first set of search results 210. The GUI of FIG. 8B also includes the subset of the elements, as well as the remaining elements of the GUI of FIG. 6A, which correspond to the second set of search results 226. In the example of FIGS. 8A-8B, both Yelp and TripAdvisor have been recently (e.g., frequently) used by the user on the user device 102 and are thus both indicated by the request 200. In this example, the user device 102 receives the first set of search results 210 from the search system 100 in response to transmitting the request 200 to the system 100. As shown in FIG. 8A, the first set of search results 210 specifies one or more (e.g., a subset of) states of Yelp and TripAdvisor. In this example, the search system 100 may have received the request 200 from the user device 102 and identified one or more function records included in the data store 110 based on the request 200, in a similar manner as described above. For example, the search system 100 may have identified a subset of the function records included in the data store 110 that each include an AAM that references one of the native apps 202 indicated by the request 200 (i.e., Yelp and TripAdvisor). In this example, a size of the subset (e.g., a number of the function records) may be defined by a threshold number of function records (e.g., also indicated by the request 200, or specified in another location). As also shown, the user device 102 displays the first set of search results 210 (i.e., as links 234-1, 234-2, 236-1, 236-3, 236-5, and 236-6) to the user in response to the user entering the search query 220 into the GUI of the search app 240.

Also in this example, the user device 102 receives the second set of search results 226 from the search system 100 in response to transmitting the search query 220 to the system 100. As shown in FIG. 8B, the second set of search results 226 specifies one or more additional states of Yelp and TripAdvisor. For example, the search system 100 may have received the search query 220 from the user device 102 and identified one or more additional function records included in the data store 110 that include AAMs that reference Yelp and TripAdvisor, in a similar manner as described above. As further shown, the user device 102 displays the second set of search results 226 (i.e., as links 236-2 and 236-4) to the user alongside the first set of search results 210 upon receiving the results 226. For example, the user device 102 may display the first set of search results 210 to the user upon the user entering the search query 220 into the GUI of the search app 240. At a later point in time (e.g., upon receiving the second set of search results 226 from the search system 100), the user device 102 may display the results 226 to the user. As also shown, the user device 102 may display the first and second sets of search results 210, 226 jointly (e.g., by interleaving the results 210, 226 within the GUI of the search app 240). In some examples, the second set of search results 226 specifies states of other native apps.

Figure 9:
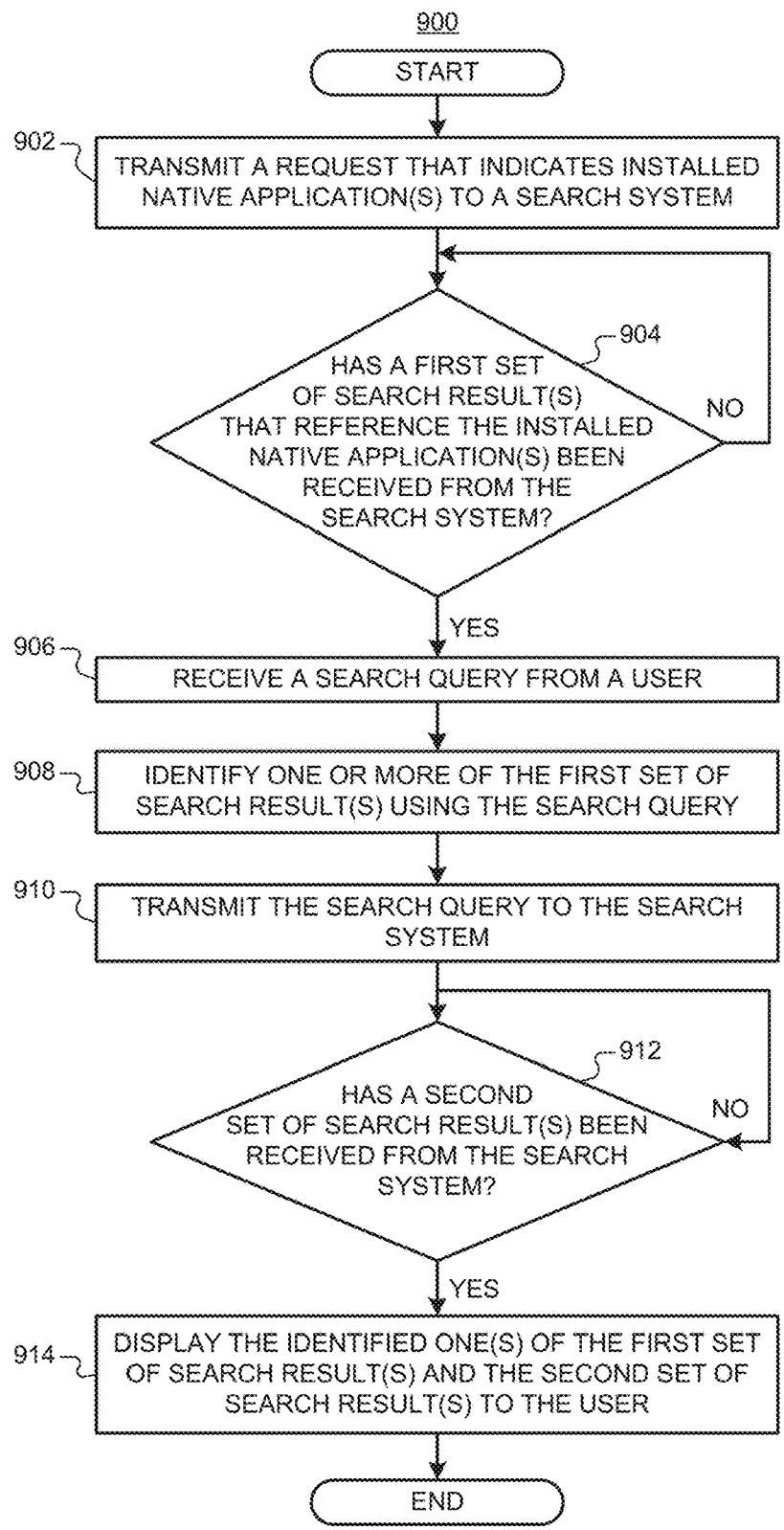
FIG. 9 is a flow diagram that illustrates an example method for generating predicted search results and search results that are responsive to a search query on a user device.

FIG. 9 illustrates an example method 900 of transmitting a request 200 to a search system 100, receiving a first set of search results 210 in response to transmitting the request 200, transmitting a search query 220 to the system 100, and receiving a second set of search results 226 in response to transmitting the query 220. The method 900 is described with reference to one of the user device(s) 102 and the various components thereof, as depicted in FIG. 2.

In block 902, the user device 102 transmits a request 200 (e.g., data) indicating one or more native apps 202 that are installed on the device 102 to the search system 100. As described herein, in some examples, the user device 102 transmits the request 200 to the search system 100 prior to the device 102 receiving a search query 220 from a user of the device 102 and prior to the device 102 transmitting the query 220 to the system 100. For example, the user device 102 may transmit the request 200 to the search system 100 upon the device 102 being turned (e.g., powered) on by the user, at another point in time (e.g., periodically at regular intervals, or upon installation of a new native app), or in response to an input received from the user (e.g., upon the user launching a search app 240 on the device 102). As also described herein, in some examples, the native apps 202 indicated by the request 200 are one or more native apps that have been recently (e.g., within the last week, or month) used by the user on the user device 102. For example, the native apps 202 may be one or more native apps that are frequently used by the user on the user device 102. In this example, the request 200 is configured to cause the search system 100 to generate a first set of one or more search results 210 and transmit the results 210 to the user device 102. Each of the first set of search results 210 includes an AAM that references one of the native apps 202 and indicates one or more operations for the app 202 to perform.

In block 904, the user device 102 waits to receive the first set of search results 210 from the search system 100 in response to transmitting the request 200. As described herein, each of the first set of search results 210 includes an AAM that references one of the native apps 202 and indicates one or more operations for the app 202 to perform.

In other words, the AAM specifies a state of the native app 202, and the app 202 performing the operations sets the app 202 into the state. In some examples, the request 200 further indicates a geographic location of the user device 102. For example, the user device 102 may transmit the request 200 to the search system 100 upon the device 102 changing its geographic location. In these examples, the request 200 may be configured to cause the search system 100 to generate the first set of search results 210 such that the state specified by each of the first set of search results 210 is associated with (e.g., constrained to be within a predetermined distance of) the geographic location indicated by the request 200. For example, the state specified by the AAM included in each of the first set of search results 210 may correspond to a product, service, or event that is available or occurring within (e.g., a predetermined distance of) the geographic location. As also described herein, upon receiving the first set of search results 210, the user device 102 may index the results 210, rendering each result 210 searchable on the device 102 using a search query 220 entered into the device 102. The user device 102 may then store the indexed first set of search results 210 on the device 102. The method 900 continues in block 906 after the user device 102 receives the first set of search results 210 from the search system 100.

In block 906, the user device 102 receives a search query 220 from the user. For example, the user may have entered the search query 220 into a search field 222 of a GUI of a search app 240 executing on the user device 102. The user may have entered the search query 220 using any of a touchscreen keypad, a mechanical keypad, and/or via speech recognition techniques. In some examples (e.g., prior to receiving the search query 220 from the user), the user device 102 transmits an autosuggest request to the search system 100 and receive autosuggest data from the system 100 in response to transmitting the request. For example, the autosuggest data may include one or more likely search queries that are associated with the native apps 202 indicated by the request 200. In some examples, the likely search queries are one or more popular search queries for the user and/or among other users of the native apps 202. In other examples, the likely search queries may be one or more search queries (e.g., keywords) that are likely to match the information (e.g., text) included in states of the native apps 202, including the states specified by the AAMs included in the first set of search results 210. In other words, the likely search queries may be tailored to the information associated with the states of the native apps 202, including those specified by the first set of search results 210. In other examples, the user device 102 may generate the autosuggest data based on the first set of search results 210 (e.g., generate one or more likely search queries that include information, such as text, associated with the states of the native apps 202 specified by the first set of search results 210 by accessing the states). In any case, the user device 102 may receive the search query 220 from the user using the autosuggest data (e.g., by auto-completing some or all of the query 220 using the data upon the user entering a portion of the query 220 into the device 102).

In block 908, the user device 102 identifies one or more of the first set of search results 210 using the search query 220. For example, the user device 102 may identify the one or more of the first set of search results 210 based on one or more matches between one or more terms of the search query 220 and one or more terms included in the identified one or more search results 210. As described herein, the user device 102 has already received the first set of search results 210 from the search system 100 in response to transmitting the request 200 to the system 100. As also described herein, in some examples, the user device 102 has further indexed the first set of search results 210, rendering each result 210 searchable on the device 102 using search queries 220. As such, the user device 102 may identify the one or more of the first set of search results 210 using the search query 220 relatively quickly (e.g., more quickly than by transmitting the query 220 to the search system 100, causing the system 100 to identify the one or more results 210 using the query 220, and receiving the results 210 from the system 100).

In block 910, the user device 102 transmits the search query 220 to the search system 100. In some examples, the user device 102 transmits the search query 220 to the search system 100 automatically (e.g., following, or in parallel with, identifying the one or more of the first set of search results 210 using the query 220, as described above). In other examples, the user may select a search button 224 of the GUI of the search app 240 to cause the user device 102 to transmit the search query 220 to the search system 100. In this example, the search query 220 is configured to cause the search system 100 to generate a second set of one or more search results 226 and transmit the results 226 to the user device 102. Also in this example, each of the second set of search results 226 may include an AAM that references a native app and indicates one or more operations for the app to perform, an ADA, a WAM, and/or other content.

In block 912, the user device 102 waits to receive the second set of search results 226 from the search system 100 in response to transmitting the search query 220. As described herein, each of one or more of the second set of search results 226 may include an AAM that references a native app and indicates one or more operations for the app to perform. In other words, the AAM may specify a state of the native app and the app performing the operations may set the app into the state. In some examples, the native app referenced by the AAM included in at least one of the second set of search results 226 is one of the native apps 202 indicated by the request 200. In other examples, at least one of the second set of search results 226 may include an ADA that indicates a location where the user device 102 may download a native app. In still other examples, at least one of the second set of search results 226 may include a WAM configured to cause a web browser app 244 of a user device 102 to access a web resource. In some examples, the second set of search results 226 includes other content (e.g., audio data, video data, and/or documents). The method 900 continues in block 914 after the user device 102 receives the second set of search results 226 from the search system 100.

In block 914, the user device 102 displays the identified one or more of the first set of search results 210 and the second set of search results 226 to the user (e.g., as user selectable links). In some examples, the one or more of the first set of search results 210 and the second set of search results 226 each include link data associated with the result 210, 226. For example, the link data may include text and/or an image that describe the search result 210, 226. In these examples, to display the search result 210, 226 to the user, the user device 102 may generate a user selectable link for the result 210, 226 using the link data associated with the result 210, 226 and display the link to the user. In other examples, the one or more of the first set of search results 210 and the second set of search results 226 may each include a result score associated with the result 210, 226. For example, the result score may indicate a rank of the search result 210, 226 relative to one or more other ones of the one or more of the first set of search results 210 and the second set of search results 226. In some examples, the user device 102 also generates a result score for each of the identified one or more of the first set of search results 210 (e.g., modify an associated result score received from the search system 100) based on the search query 220 (e.g., as part of identifying the result 210 using the query 220), as described herein. In any case, in these examples, to display the search result 210, 226 to the user, the user device 102 may arrange the result 210, 226 in an order along with one or more other ones of the one or more of the first set of search results 210 and the second set of search results 226 based on the result score associated with each result 210, 226. For example, the user device 102 may interleave the one or more of the first set of search results 210 and the second set of search results 226 based on the result scores associated therewith. In still other examples, to display the identified one or more of the first set of search results 210 and the second set of search results 226 to the user, the user device 102 may display an indication (e.g., using image, text, and/or other data) that the identified one or more of the first set of search results 210 are different than the second set of search results 226. For example, the user device 102 may display the one or more of the first set of search results 210 and the second set of search results 226 separately (e.g., using unique headers) within the GUI of the search app 240.

In some examples, the user device 102 further receives, or detect, a selection of one of the identified one or more of the first set of search results 210 and the second set of search results 226 displayed to the user from the user. For example, the user may select the search result 210, 226 by clicking or tapping on a region of a display of the user device 102 used to display the result 210, 226 (e.g., the user selectable link generated for the result 210, 226). In some examples, in response to the user selecting the search result 210, 226, the user device 102 launches a native app (e.g., one of the native apps 202 indicated by the request 200, or another native app) referenced by the AAM included in the result 210, 226 and set the app into a state specified by the AAM (e.g., cause the app to perform one or more operations indicated by the AAM). In other examples, in response to the user selecting the search result 210, 226, the user device 102 may download a native app using an ADA included in the result 210, 226. In still other examples, in response to the user selecting the search result 210, 226, the user device 102 may launch a web browser app 244 and access a web resource specified by a WAM (e.g., a URL) included in the result 210, 226 using the app 244. In additional examples, in response to the user selecting the search result 210, 226, the user device 102 may access other content (e.g., native apps, audio data, video data, and/or documents), as described herein. In still other examples, the user device 102 may also display one or more contacts (e.g., names, phone numbers and/or e-mail addresses) stored on the device 102 within the same GUI of the search app 240. For example, the user device 102 may identify the contacts using the search query 220.

Figure 10:
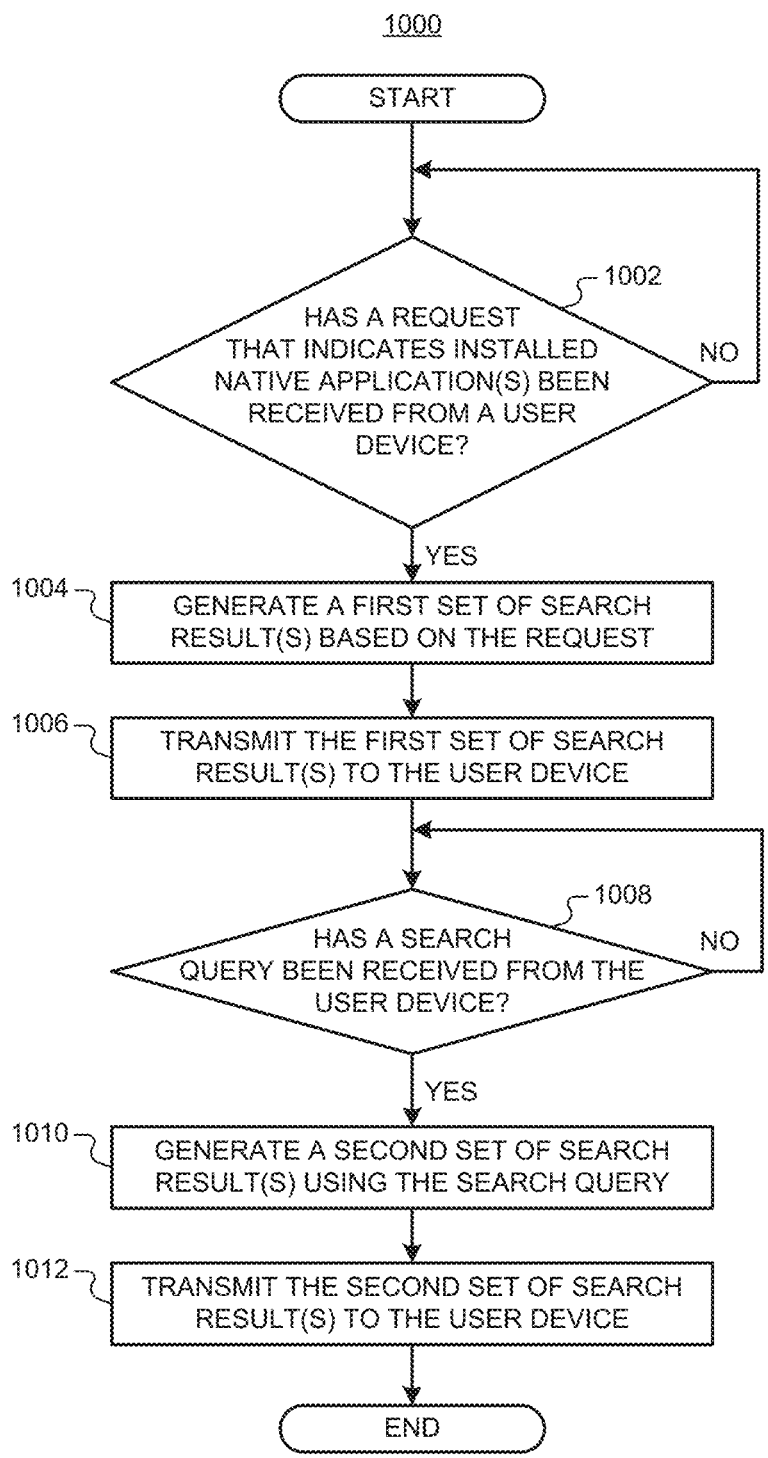
FIG. 10 is a flow diagram that illustrates an example method for generating predicted search results and search results that are responsive to a search query at a search system.

FIG. 10 illustrates an example method 1000 of receiving a request 200 from a user device 102, generating a first set of search results 210 using the request 200, receiving a search query 220 from the device 102, and generating a second set of search results 226 using the query 220. The method 1000 is described with reference to the search system 100 and the various components thereof, as depicted in FIGS. 4A-4B. In block 1002, the search system 100 waits to receive a request 200 (e.g., data) indicating one or more native apps 202 that are installed on the user device 102 from the device 102. As described herein, in some examples, the search system 100 receives the request 200 from the user device 102 prior to the system 100 receiving a search query 220 from the device 102. For example, the search system 100 may receive the request 200 from the user device 102 upon the device 102 being turned (e.g., powered) on by a user of the device 102, at another point in time (e.g., periodically at regular intervals, or upon installation of a new native app on the device 102), or in response to the device 102 receiving an input from the user (e.g., upon the user launching a search app 240 on the device 102). As also described herein, in some examples, the native apps 202 indicated by the request 200 are one or more native apps that have been recently (and, e.g., frequently) used by the user on the user device 102. In this example, the request 200 is configured to cause the search system 100 to generate a first set of one or more search results 210 and transmit the results 210 to the user device 102. Also in this example, each of the first set of search results 210 includes an AAM that references one of the native apps 202 indicated by the request 200 and indicates one or more operations for the app to perform. The method 1000 continues in block 1004 after the search system 100 receives the request 200 from the user device 102.

In block 1004, the search system 100 generates the first set of search results 210 based on the request 200 (e.g., in response to receiving the request 200 from the user device 102). As described herein, each of the first set of search results 210 includes an AAM that references one of the native apps 202 indicated by the request 200 and indicates one or more operations for the app 202 to perform (e.g., the AAM specifies a state of the native app 202 and the app 202 performing the operations sets the app 202 into the state). In some examples, to generate the first set of search results 210 based on the request 200, the search system 100 (e.g., the search module 108) identifies one or more function records included in the data store 110 based on the request 200 and select one or more function IDs 248 from the identified records. For example, the search system 100 may identify the function records by determining that the AAM included in each record references one of the native apps 202 indicated by the request 200. In other examples, the request 200 may further indicate a geographic location of the user device 102. For example, the search system 100 may receive the request 200 from the user device 102 upon the device 102 changing its geographic location. In these examples, the request 200 may be configured to cause the search system 100 to generate the first set of search results 210 such that the state specified by the AAM included in each result 210 is associated with the geographic location indicated by the request 200 (e.g., corresponds to a product, service, or event that is available or occurring within the geographic location). For example, the search system 100 may identify the function records by determining that the AAM included in each record is associated with the geographic location. In some examples, the indication of the native apps 202 and/or the geographic location included in the request 200 is stored in the data store 114 of the search system 100. In any case, the search system 100 (e.g., the result generation module 112) may generate the first set of search results 210 using the selected function ID(s) 248 (e.g., by selecting one or more AAMs from the function records identified by the function ID(s) 248. In block 1006, the search system 100 transmits the first set of search results 210 to the user device 102.

In block 1008, the search system 100 waits to receive a search query 220 from the user device 102. As described herein, the user of the user device 102 may have entered the search query 220 into a search field 222 of a GUI of a search app 240 executing on the device 102. In this example, the search query 220 is configured to cause the search system 100 to generate a second set of one or more search results 226 and transmit the results 226 to the user device 102. Also in this example, each of the second set of search results 226 may include an AAM that references a native app (e.g., one of the native apps 202, or another native app) and indicates one or more operations for the app to perform, an ADA, a WAM, and/or other content. In some examples (e.g., prior to receiving the search query 220 from the user device 102), the search system 100 receives an autosuggest request from the user device 102, generate autosuggest data in response to receiving the request, and transmit the data to the user device 102. The autosuggest data may indicate one or more likely search queries that are associated with the native apps 202. In some examples, the likely search queries are one or more popular search queries for the user and/or among other users of the native apps 202. In other examples, the likely search queries may be one or more search queries that are likely to match the information included in states of the native apps 202, including those specified by the AAMs included in the first set of search results 210. In any case, the method 1000 continues in block 1010 after the search system 100 receives the search query 220 from the user device 102.

In block 1010, the search system 100 generates the second set of search results 226 based on the search query 220 (e.g., in response to receiving the query 220 from the user device 102). As described herein, each of one or more of the second set of search results 226 may include an AAM that references a native app and indicates one or more operations for the app to perform (e.g., the AAM specifies a state of the app and the app performing the operations sets the app into the state). In some examples, the native app referenced by the AAM included in at least one of the second set of search results 226 is one of the native apps 202. In other examples, at least one of the second set of search results 226 may include an ADA that indicates a location where the user device 102 may download a native app. In still other examples, at least one of the second set of search results 226 may include a WAM configured to cause a web browser app 244 of a user device 102 to access a web resource. The second set of search results 226 may include other content (e.g., native apps, audio data, video data, and/or documents).

In some examples, to generate the second set of search results 226 based on the search query 220, the search system 100 (e.g., the search module 108) identifies one or more function records included in the data store 110 based on the query 220 and select one or more function IDs 248 from the identified records. For example, the search system 100 may identify the function records based on one or more matches between one or more terms of the search query 220 and one or more terms (e.g., of ASI) included in the records. The search system 100 (e.g., the result generation module 112) may then generate the second set of search results 226 using the selected function ID(s) 248 (e.g., by selecting one or more AAMs, ADAs, WAMs, and/or other information from the function records identified by the ID(s) 248. In block 1012, the search system 100 transmits the second set of search results 226 to the user device 102.

The modules and data stores included in the search system 100 represent features or functionality that may be included in the system 100 as it is described in the present disclosure. For example, the search module 108, data store 110, result generation module 112, app use data store 114, and the components thereof may represent features included in the search system 100. The modules and data stores described herein may be embodied by electronic hardware, software, firmware, or any combination thereof. Depiction of different features or functionality as separate modules or data stores does not necessarily imply whether the modules or data stores are embodied by common or separate electronic hardware, software, or firmware components. In some examples, the features or functionality associated with one or more of the modules and data stores depicted herein are realized by common or separate components.

The modules and data stores may be embodied by electronic hardware, software, and/or firmware components including one or more processing units, memory components, input/output (I/O) components, and interconnect components. The interconnect component(s) may be configured to provide communication between the processing unit(s), memory component(s), and I/O component(s). For example, the interconnect component(s) may include one or more buses configured to transfer data between electronic components. The interconnect component(s) may also include one or more control circuits (e.g., a memory controller and/or an I/O controller) configured to control communication between electronic components.

The processing unit(s) may include one or more central processing units (CPUs), graphics processing units (GPUs), digital signal processing units (DSPs), app specific integrated circuits (ASICs), field programmable gate arrays (FPGAs), and/or other processing units. The processing unit(s) may be configured to communicate with the memory component(s) and I/O component(s). For example, the processing unit(s) may be configured to communicate with the memory component(s) and I/O component(s) via the interconnect component(s).

A memory component, or memory, as described herein may include any volatile or non-volatile media. For example, a memory may include electrical, magnetic, and/or optical media, such as random access memory (RAM), non-volatile RAM (NVRAM), read-only memory (ROM), electrically-erasable programmable ROM (EEPROM), Flash memory, solid state drives (SSDs), hard disk drives (HDDs), magnetic tape drives, optical storage technology (e.g., compact, digital versatile, and/or Blu-ray disc), or any other equivalent components.

The memory component(s) may include (e.g., store) various data. For example, the memory component(s) may store data included in one or more of the function record(s) of the data store 110. The memory component(s) may also store the indications of the installed apps 202 and the app use data 204 of the app use data store 114. The memory component(s) may also include one or more instructions that may be executed by the processing unit(s). For example, the memory component(s) may include one or more computer-readable instructions that, when executed by the processing unit(s), cause the processing unit(s) to perform the various functions attributed to the modules and data stores described herein.

The I/O component(s) may refer to electronic hardware, software, and/or firmware that provide communication with various different devices. For example, the I/O component(s) may provide communication between other devices and the processing unit(s) and memory component(s). In some examples, the I/O component(s) are configured to communicate with a computer network, such as the network 106. For example, the I/O component(s) may be configured to exchange data over a computer network using any of a variety of different physical connections, wireless connections, and protocols. The I/O component(s) may include one or more network interface components (e.g., a network interface controller), repeaters, network bridges, network switches, routers, and firewalls. In some examples, the I/O component(s) includes hardware, software, and/or firmware configured to communicate with various human interface devices, including display screens, keyboards, pointer devices (e.g., a mouse), touchscreens, speakers, and microphones. In other examples, the I/O component(s) may provide communication with additional devices, such as external memory (e.g., external HDDs).

In some examples, the search system 100 is a system of one or more computing devices (e.g., a computerized search system) configured to implement the techniques described herein. In other words, the features or functionality attributed to the modules and data stores described herein may be implemented by one or more computing devices. Each computing device may include any combination of electronic hardware, software, and/or firmware, as described above. Additionally, each computing device may include any combination of processing units, memory components, I/O components, and interconnect components, as also described above. The computing device(s) may also include various human interface devices, including display screens, keyboards, pointing devices (e.g., a mouse), touchscreens, speakers, and microphones. The computing device(s) may also be configured to communicate with additional devices, such as external memory (e.g., external HDDs).

The computing device(s) of the search system 100 may be configured to communicate with the network 106. The computing device(s) may also be configured to communicate with one another (e.g., within the system 100) via a computer network. In some examples, the computing device(s) includes one or more server computing devices configured to communicate with the user device(s) 102 (e.g., receive requests 200 and search queries 220, and transmit first and second sets of search results 210 and 226). The server computing device(s) may also gather data from the data source(s) 104, index the data, and store the data, as well as gather, index, and/or store other documents or information. The computing device(s) may reside within a single machine or within multiple machines at a single geographic location, or may be distributed across a number of geographic locations.

Additionally, the various implementations of the search system 100 described above (e.g., using one or more computing devices that include one or more processing units, memory components, I/O components, and interconnect components) are equally applicable to any of the user device(s) 102, as well as to the various components thereof, as described herein.

What is claimed is:

1. A method comprising:
    before receiving a search query from a user at a user device, transmitting, using the user device, a request to a search system, wherein the request indicates at least one application installed on the user device;
    receiving a first set of search results from the search system at the user device in response to transmitting the request, wherein the first set of search results corresponds to at least one first application installed in the user device and includes first information for referencing the at least one first application;
    after receiving the first set of search results, receiving the search query from the user at the user device;
    displaying, using the user device, at least one search result of the first set of search results which is identified using the search query, wherein the at least one search result is for accessing to at least one state of at least one of the at least one first application;
    transmitting, using the user device, the search query to the search system;
    based on transmitting the search query, receiving a second set of search results from the search system at the user device, wherein the second set of search results corresponds to at least one second application which is different with the at least one first application and includes second information for accessing to at least one state of the at least one second application; and
    displaying the at least one search result of the first set of search results for accessing the at least one state of the at least one of the at least one first application and the second set of search results for accessing to the at least one state of the at least one second application simultaneously at the user device.

2. The method of claim 1, wherein the at least one application indicated by the request comprises the at least one first application that has been recently used by the user on the user device.

3. The method of claim 1, wherein the at least one application indicated by the request comprises the at least one first application frequently used by the user on the user device.

4. The method of claim 1,
    wherein the first information included in the first set of search results specifies at least one first state of the at least one first application referenced by the first information, and
    wherein the at least one first application accesses into the state by performing at least one operation indicated by the first information.

5. The method of claim 4,
    wherein the request further indicates a geographic location of the user device, and
    wherein the at least one first state specified by the first information included in the first set of search results is associated with the geographic location indicated by the request.

6. The method of claim 1, further comprising:
    indexing, using the user device, the first set of search results on the user device such that each of the first set of search results is searchable on the user device using the search query entered into the user device; and
    storing the indexed each of the first set of search results on the user device.

7. The method of claim 1, further comprising:
    transmitting, using the user device, an autosuggest request to the search system, and receiving autosuggest data from the search system at the user device in response to the transmitting of the autosuggest request, wherein the autosuggest data indicates at least one likely search query associated with the at least one first application indicated by the request, and
    wherein the receiving of the search query from the user comprises receiving the search query using the autosuggest data.

8. The method of claim 7, wherein the at least one likely search queries indicated by the autosuggest data comprise at least one term included in at least one first state of the at least one first application indicated by the request.

9. The method of claim 7, wherein the at least one likely search query indicated by the autosuggest data comprises at least one search query generated by at least one user of the at least one first application indicated by the request.

10. The method of claim 1,
    wherein the first information included in the first set of search results specifies at least one first state of the at least one first application referenced by the first information, wherein the at least one first application accesses into the at least one first state by performing at least one operation indicated by the first information, the method further comprising:
for at least one of the first set of search results, accessing, using the user device, the at least one state specified by the first information included in the search result,
determining, using the user device, at least one term included in the at least one state, and
generating, using the user device, autosuggest data based on the at least one term,
wherein the autosuggest data indicates at least one likely search queries associated with the first set of search results, and
wherein receiving the search query from the user comprises receiving the search query using the autosuggest data.

11. The method of claim 1, wherein the displaying of the at least one search result of the first set of search results using the search query comprises displaying each of the at least one search result of the first set of search results based on at least one match between at least one term of the search query and at least one term included in the at least one search result.

12. The method of claim 1,
wherein the first information specifies at least one first state of the at least one first application for performing at least one operation.

13. The method of claim 1, further comprising:
receiving, using the user device, a result score associated with each of the at least one search result of the first set of search results and each of the second set of search results from the search system, wherein the result score indicates a rank of a search result relative to at least other one of the at least one search result of the first set of search results and the second set of search results, and
wherein the displaying comprises arranging an order of the at least one search result of the first set of search results and the second set of search results based on the result score.

14. The method of claim 13, further comprising modifying, using the user device, the result score associated with each of the at least one search result of the first set of search results based on the search query.

15. The method of claim 1, wherein the displaying of the at least one search result of the first set of search results and the second set of search results comprises displaying an indication that the at least one search result of the first set of search results are different than the second set of search results.

16. A method comprising:
receiving a request from a user device, wherein the request indicates one or more native applications that are installed on the user device;
identifying a first set of function records using the request, each function record of the first set of function records including an application access mechanism (AAM) and application state information (ASI), wherein the AAM references a native application and indicates one or more operations for the native application to perform, wherein the ASI describes a state of the native application after the native application has performed the one or more operations, and wherein the identifying of the first set of function records using the request comprises determining that the AAM included in each function record of the first set of function records references one of the one or more native applications indicated by the request;
selecting a first one or more AAMs from the first set of function records;
transmitting the first one or more AAMs to the user device;
receiving a search query from the user device;
identifying a second set of function records using the search query, each function record of the second set of function records including the AAM and the ASI, wherein the AAM references the native application and indicates one or more operations for the native application to perform, and wherein the ASI describes the state of the native application after the native application has performed the one or more operations;
selecting a second one or more AAMs from the second set of function records; and
transmitting the second one or more AAMs to the user device.

17. The method of claim 16, wherein the one or more native applications indicated by the request comprise at least one of one or more native applications that have been recently used by a user on the user device and one or more native applications that are frequently used by the user on the user device.

18. The method of claim 16,
wherein the AAM included in each of the first set of function records specifies a state of the one of the one or more native applications referenced by the AAM, and
wherein the native application performing the one or more operations indicated by the AAM sets the native application into the state.

19. The method of claim 18, further comprising:
determining one or more most recently updated states of the one or more native applications indicated by the request,
wherein the identifying of the first set of function records using the request further comprises determining that the AAM included in each function record of the first set of function records specifies one of the one or more most recently updated states.

20. The method of claim 18, further comprising:
determining one or more most popular states of the one or more native applications indicated by the request,
wherein the identifying of the first set of function records using the request comprises determining that the AAM included in each function record of the first set of function records specifies one of the one or more most popular states.

21. The method of claim 18,
wherein the request further indicates a geographic location of the user device, and
wherein the identifying of the first set of function records using the request further comprises determining that the state specified by the AAM included in each of the first set of function records is associated with the geographic location indicated by the request.

22. The method of claim 16, further comprising:
receiving an autosuggest request from the user device;
generating autosuggest data in response to receiving the autosuggest request, wherein the autosuggest data indicates one or more likely search queries that are associated with the one or more native applications indicated by the request; and
transmitting the autosuggest data to the user device.

23. The method of claim 22, wherein the generating of the autosuggest data comprises one or more of the following:
    determining one or more terms included in one or more states of the one or more native applications indicated by the request, and including the one or more terms in the autosuggest data; and
    determining one or more search queries generated by one or more users of the one or more native applications, and including the one or more search queries in the autosuggest data.

24. The method of claim 16, wherein the identifying of the second set of function records using the search query comprises identifying each function record based on one or more matches between one or more terms of the search query and one or more terms of the ASI included in the identified function record.

25. The method of claim 16,
    wherein the AAM included in each of the second set of function records specifies the state of the native application referenced by the AAM, and
    wherein the native application performing the one or more operations indicated by the AAM sets the native application into the state.

26. The method of claim 16,
    wherein the AAM included in each function record of the first and second sets of function records is associated with a result score, and
    wherein the result score indicates a rank of the AAM relative to one or more other AAMs included in the first and second sets of function records, and
    wherein the method further comprising:
        selecting the result score from each of one or more of the first and second sets of function records, and
        transmitting the selected one or more results scores to the user device.

27. A system comprising:
    at least one processor; and
    at least one memory storing one or more computer programs, including instructions configured to be executed by the least one processor, wherein the one or more computer programs include instructions to at least:
        before receiving a search query from a user at a user device, transmit, using the user device, a request to a search system, wherein the request indicates one or more native applications that are installed on the user device,
        receive a first set of search results from the search system at the user device in response to transmitting the request, wherein the first set of search results corresponds to at least one first application installed in the user device and includes first information for referencing the at least one first application,
        after receiving the first set of search results, receive the search query from the user at the user device,
        display, using the user device, at least one search result of the first set of search results which is identified using the search query, wherein the at least one search result is for accessing to at least one state of at least one of the at least one first application,
        transmit, using the user device, the search query to the search system,
        based on transmitting the search query, receive a second set of search results which is different with the first set of search results from the search system at the user device, wherein the second set of search results corresponds to at least one second application which is different with the at least one first application and includes second information for accessing to at least one state of the at least one second application, and
        display the at least one search result of the first set of search results for accessing the at least one state of the at least one of the at least one first application and the second set of search results for accessing to the at least one state of the at least one second application simultaneously at the user device.

28. A system comprising:
    at least one processor; and
    at least one memory storing one or more computer programs, including instructions configured to be executed by the at least one processor, wherein the one or more computer programs include instructions to at least:
        receive a request from a user device, wherein the request indicates one or more native applications that are installed on the user device,
        identify a first set of function records using the request, each function record of the first set of function records including an application access mechanism (AAM) and application state information (ASI), wherein the AAM references a native application and indicates one or more operations for the native application to perform, wherein the ASI describes a state of the native application after the native application has performed the one or more operations, and wherein to identify the first set of function records using the request, the one or more computer programs are configured to determine that the AAM included in each function record of the first set of function records references one of the one or more native applications indicated by the request,
        select a first one or more AAMs from the first set of function records,
        transmit the first one or more AAMs to the user device,
        receive a search query from the user device,
        identify a second set of function records using the search query, each function record of the second set of function records including the AAM and the ASI, wherein the AAM references the native application and indicates one or more operations for the native application to perform, and wherein the ASI describes the state of the native application after the native application has performed the one or more operations,
        select a second one or more AAMs from the second set of function records, and
        transmit the second one or more AAMs to the user device.

* * * * *